US012801830B2

(12) United States Patent
Kasat et al.

(10) Patent No.: US 12,801,830 B2
(45) Date of Patent: Nov. 17, 2026

(54) GENERATING COMBINED FONT RECOMMENDATIONS USING A CLASSIFIER NEURAL NETWORK AND FONT EMBEDDINGS VECTORS

(71) Applicant: Adobe Inc., San Jose, CA (US)

(72) Inventors: Hemant Kasat, Noida (IN); Kaushal Kishore, New Delhi (IN); Amit Vikram Singh, Benares (IN); Praveen Kumar Dhanuka, Howrah (IN); Vineet Batra, Pitam Pura (IN)

(73) Assignee: Adobe Inc., San Jose, CA (US)

( * ) Notice: Subject to any disclaimer, the term of this patent is extended or adjusted under 35 U.S.C. 154(b) by 138 days.

(21) Appl. No.: 19/021,687

(22) Filed: Jan. 15, 2025

(65) Prior Publication Data

US 2026/0203491 A1 Jul. 16, 2026

(51) Int. Cl.
*G06F 40/109* (2020.01)
*G06T 11/60* (2006.01)
*G06V 30/18* (2022.01)
*G06V 30/244* (2022.01)

(52) U.S. Cl.
CPC ............ *G06F 40/109* (2020.01); *G06T 11/60* (2013.01); *G06V 30/18* (2022.01); *G06V 30/245* (2022.01)

(58) Field of Classification Search
None
See application file for complete search history.

(56) References Cited

U.S. PATENT DOCUMENTS

2019/0130231 A1* 5/2019 Liu ........................ G06V 10/82
2019/0138860 A1* 5/2019 Liu ........................ G06F 18/214
2019/0147304 A1* 5/2019 Liu ........................ G06N 3/084
382/157

OTHER PUBLICATIONS

Jian Ye, Zhe Chen, Juhua Liu, and Bo Du."TextFuseNet: Scene Text Detection with Richer Fused Features". In Proceedings of the Twenty-Ninth International Joint Conference on Artificial Intelligence, IJCAI-20, pp. 516-522. 2020.
Yaniv Taigman, Ming Yang, Marc'Aurelio Ranzato, and Lior Wolf "DeepFace: Closing the Gap to Human-Level Performance in Face Verification". In 2014 IEEE Conference on Computer Vision and Pattern Recognition, pp. 1701-1708, 2014.
(Continued)

*Primary Examiner* — Nicholas R Wilson
(74) *Attorney, Agent, or Firm* — Keller Preece PLLC

(57) ABSTRACT

The present disclosure relates to systems, non-transitory computer readable media, and methods for generating a set of suggested fonts matching the font of a text region of a digital image. In some embodiments, the disclosed systems generate an image embedding vector from a portion of a digital image including digital text utilizing a classifier neural network. In some embodiments, the disclosed systems generate a set of one or more embedding vectors from a set of one or more unlearned fonts based on stylized glyphs according to the set of one or more unlearned fonts by utilizing the classifier neural network. In some embodiments, the disclosed systems determine one or more suggested fonts from the set of one or more unlearned fonts based on one or more similarity scores comparing the image embedding vector to the one or more font embedding vectors and displaying the one or more suggested fonts.

20 Claims, 12 Drawing Sheets

(56) References Cited

OTHER PUBLICATIONS

Yi Sun, Xiaogang Wang, and Xiaoou Tang. "Deeply Learned Face Representations are Sparse, Selective, and Robust". In 2015 IEEE Conference on Computer Vision and Pattern Recognition (CVPR), pp. 2892-2900, Los Alamitos, CA, USA, Jun. 2015.
Zhangyang Wang, Jianchao Yang, Hailin Jin, Eli Shechtman, Aseem Agarwala, Jonathan Brandt, and Thomas S. Huang. "DeepFont: Identify Your Font From an Image", 9 pages, arXiv preprint arXiv:1507.03196, Jul. 12, 2015.

* cited by examiner

GENERATING COMBINED FONT RECOMMENDATIONS USING A CLASSIFIER NEURAL NETWORK AND FONT EMBEDDINGS VECTORS

BACKGROUND

Recent years have seen an increase in use of machine-learning techniques for digital content editing operations. Indeed, many digital content editing applications use machine-learning models to simplify digital content editing processes via the use of various tools for detecting or extracting content from existing digital files (e.g., digital images) to use in other digital files, such as tools for font recognition. A key challenge in generating font recommendations to match a font from a digital file involves the availability of different fonts in recognized font collections and fonts stored locally on a client device of a user. Specifically, due to different font availability for different use cases (e.g., for different users), generating a recommendation for a font in a digital file (e.g., a digital image) using machine-learning models often involves detecting matches with known fonts (e.g., from the recognized font collections) and/or unknown fonts (e.g., from a user's client device. Despite the advancements in machine-learning models, existing systems exhibit a number of drawbacks or disadvantages in generating font recommendations for detected fonts in digital files.

SUMMARY

This disclosure describes one or more embodiments of systems, methods, and non-transitory computer readable media that solve one or more of the foregoing or other problems in the art by generating a font recommendation by utilizing a classifier neural network in combination with font embeddings of learned and/or unlearned fonts. In one or more embodiments, the disclosed systems generate a set of suggested fonts by generating an image embedding vector from a text region of a digital image using a trained classifier neural network. In one or more embodiments, the disclosed systems utilize the trained classifier neural network to generate a set of font embedding vectors from a set of locally stored fonts ("unlearned fonts") and determines suggested fonts by comparing the image embedding vector and the font embedding vectors. In one or more embodiments, the disclosed systems generate a set of font embedding vectors from a set of fonts from a font collection ("learned fonts") and determines a set of combined suggested fonts of learned and unlearned fonts by comparing the image embedding vector, the font embedding vectors from the unlearned fonts, and the font embedding vectors from the learned fonts. In one or more embodiments, the disclosed systems also re-rank the suggested fonts by comparing embedding vectors of generated images including text from the digital image stylized according to the set of suggested fonts to the image embedding vector of the digital image.

BRIEF DESCRIPTION OF THE DRAWINGS

The disclosure describes one or more embodiments of the invention with additional specificity and detail by referencing the accompanying FIGURES. The following paragraphs briefly describe those FIGURES, in which.

DETAILED DESCRIPTION

Figure 1:
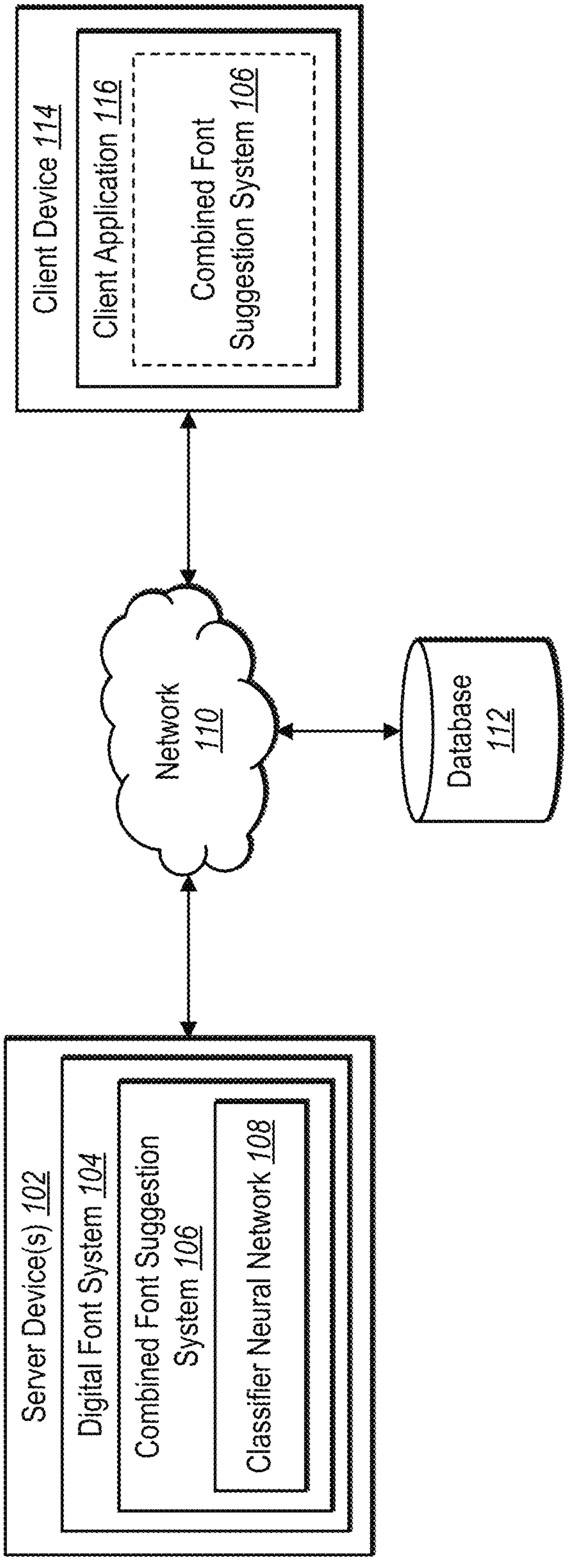
FIG. 1 illustrates a diagram of an environment in which a combined font suggestion system operates in accordance with one or more embodiments.

This disclosure describes one or more embodiments of a combined font suggestion system that generates font recommendations to match a text region of a digital image, recommending fonts locally stored on a device and/or stored in a font collection. For example, the combined font suggestion system uses a classifier neural network to extract an image embedding vector from the text region of the digital image and one or more font embedding vectors for one or more unlearned fonts (e.g., fonts stored locally on a client device). In one or more embodiments, the combined font suggestion system compares the image embedding vector and the one or more font embedding vectors of the unlearned font(s) to generate a set of similarity scores indicating the similarity of the font of the text region to the one or more unlearned fonts. In one or more embodiments, the combined font suggestion system generates a set of suggested fonts based on the set of similarity scores.

In one or more embodiments, in addition to the image embedding vector and the one or more font embedding vectors of the unlearned font(s), the combined font suggestion system extracts one or more font embedding vectors for one or more learned fonts (e.g., fonts on which the classifier neural network is trained). In one or more embodiments, the combined font suggestion system compares the image embedding vector with the font embedding vector(s) of the unlearned font(s) and the one or more font embedding vector(s) of the learned font(s) to generate a set of similarity scores indicating the similarity of the font of the text region to the one or more unlearned fonts and the one or more learned fonts. In one or more embodiments, the combined font suggestion system generates a combined set of suggested fonts including both learned and unlearned fonts based on the set of similarity scores.

In one or more embodiments, the combined font suggestion system re-ranks the one or more suggested fonts by comparing the one or more suggested fonts with additional font embedding vectors representing the text region of the digital image stylized according to the one or more suggested learned/unlearned fonts. In one or more embodiments, the combined font suggestion system generates additional digital images including the text of the text region in the style of the fonts from the combined set of suggested fonts and rendered against a background. In one or more embodiments, the combined font suggestion system extracts an image embedding vector for each rendered image and compares them with the image embedding vector of the text region in the digital image to generate a plurality of similarity scores. In one or more embodiments, the combined font suggestion system re-ranks the combined set of suggested fonts based on the similarity scores comparing the font embedding vector to the image embedding vector.

Although some conventional systems generate font suggestions for various digital content generation and editing operations, such systems have a number of problems or inadequacies in relation to accuracy, flexibility, and efficiency. For instance, conventional systems inaccurately generate font suggestions, recommending fonts that do not resemble the font being searched. To illustrate, some conventional systems that generate font recommendations provide recommend fonts that do not resemble the searched font or only superficially resemble the searched font. Further, some conventional systems only recommend fonts from a font collection, limiting the ability to recommend accurate fonts when the actual font is not in the font collection.

Additionally, conventional systems are inflexible. For instance, certain conventional systems are limited to recommending fonts that are part of the training data on which the conventional systems (e.g., classifier models used by the conventional systems) have been trained. Because conventional systems are reliant on their training data, conventional systems are incapable of recommending locally downloaded or custom fonts that are not part of a conventional training dataset. Due to their reliance on their training data, conventional systems often are incapable of recommending fonts locally downloaded to a client device or that are a custom design.

Beyond being inaccurate and inflexible, some conventional systems are also inefficient. For instance, some conventional systems require downloading additional fonts for further training to recommend locally downloaded or custom fonts. Uploading additional fonts for training requires not only generation of additional training data but also training the conventional system to recognize the locally downloaded or custom fonts. The timing and expense of computer memory and processing resources is only made worse given that such systems require such training for each additional font added to a set of locally downloaded fonts (or other fonts outside the training dataset).

As suggested, embodiments of the combined font suggestion system provide several advantages and benefits over conventional systems. For example, by generating combined suggestions including both learned and unlearned fonts, as well as the re-ranking process, the combined font suggestion system improves accuracy relative to conventional systems. Specifically, by extracting embedding vectors for both unlearned fonts and learned fonts to use in generating a combined set of suggested fonts, the combined font suggestion system accurately recommends fonts regardless of origin. Further, by re-ranking combined font suggestions, the combined font suggestion system generates improved font suggestions that accurately match the searched text in an order based on similarity to a detected font in a digital image.

The combined font suggestion system further improves flexibility relative to conventional systems. Specifically, by leveraging a classifier neural network trained on a set of learned fonts to generate and compare embedding vectors from unlearned fonts as well as from the learned fonts, the combined font suggestion system flexibly applies learned features from the learned fonts to unlearned fonts (e.g., locally downloaded fonts or other fonts that the classifier neural network has not seen). Accordingly, in contrast to conventional systems that are unable to identify local fonts on a client device external to a training dataset, the combined font suggestion system accurately identifies and recommends unlearned fonts from any location utilizing the same classifier neural network. For example, by extracting embedding vectors from unlearned locally available fonts to use in comparing to an embedding vector of a text region of a digital image, the combined font suggestion system is capable of recommending fonts that were recently downloaded or added, improving flexibility.

The combined font suggestion system further improves efficiency relative to conventional systems. Specifically, by utilizing embedding vectors representing unlearned fonts and/or learned fonts generated via a single classifier neural network, the combined font suggestion system recognizes and suggests fonts that were not originally part of the training data. Further, by extracting embedding vectors from locally available fonts, the combined font suggestion system generates font suggestions for fonts that have recently been downloaded or designed without retraining the whole system, reducing the amount of computer memory and processing expended. Thus, in contrast to conventional systems that otherwise require retraining of a classifier model to provide recommendations of unlearned fonts, the combined font suggestion system provides recommendations of unlearned fonts without the need to generate new training data and/or to retrain a classifier model for each new font.

Additional detail regarding the combined font suggestion system 106 will now be provided with reference to the FIGURES. For example, FIG. 1 illustrates a schematic diagram of an example system environment for implementing a combined font suggestion system 106 in accordance with one or more embodiments. An overview of the combined font suggestion system 106 is described in relation to FIG. 1. Thereafter, a more detailed description of the components and processes of the combined font suggestion system 106 is provided in relation to the subsequent figures.

As shown, the environment includes server device(s) 102, a database 112, a network 110, and a client device 114. Each of the components of the environment communicate via the network 110, and the network 110 is any suitable network over which computing devices communicate.

As mentioned, the environment includes a client device 114. The client device 114 is one of a variety of computing devices, including a smartphone, a table, a smart television, a desktop computer, a laptop computer, a virtual reality device, an augmented reality device, or another computing device. The client device 114 communicates with the server device(s) 102 via the network 110. For example, the client device 114 provides information to server device(s) 102 indicating client device interactions (e.g., a selected digital image containing a text region for detecting a font) and receives information from the server device(s) 102 (e.g., recommended fonts). Thus, in some cases, the combined font suggestion system 106 on the server device(s) 102 provides and receives information based on client device interaction via the client device 114.

As shown in FIG. 1, the client device 114 includes a client application 116. In particular, the client application 116 is a web application, a native application installed on the client device 114 (e.g., a mobile application, a desktop application, etc.), or a cloud-based application where all or part of the functionality is performed by the server device(s) 102. Based on instructions from the client application 116, the client device 114 presents or displays information to a user. In some cases, the client device 114 includes a version of the combined font suggestion system 106.

As illustrated in FIG. 1, the environment includes the server device(s) 102. The server device(s) 102 generates, determines, tracks, stores, processes, receives, and transmits electronic data, such as digital images, extracted text regions of digital images, one or more unlearned fonts, and one or more learned fonts. The server device(s) 102, for example, receives data from the client device 114 in the form of an indication of a client device interaction (e.g., a selected digital image containing a text region or a set of unlearned fonts) to generate a font suggestion for a text region in a digital image (e.g., via a classifier neural network 108) from, or indicated by, the client device interaction. In response, the server device(s) 102 transmits data to the client device 114 to display or present a set of suggested fonts based on the client device interaction.

In some embodiments, the server device(s) 102 communicates with the client device 114 to transmit and/or receive data via the network 110, including client device interactions, digital images containing text regions, fonts, and/or other data. In some embodiments, the server device(s) 102 comprises a distributed server where the server device(s) includes a number of server devices distributed across the network 110 and located in different physical locations. The server device(s) 102 comprise a content server, an application server, a communication server, a content editing server, a web-hosting server, a multidimensional server, and/or a machine learning server. The server device(s) 102 further access and utilize the database 112 to store and retrieve information such as digital images containing text regions, learned and/or unlearned fonts, all or part of the classifier neural network 108, and/or other data.

In some cases, a neural network includes or refers to a machine learning model trained and/or tuned based on inputs to determine classifications, scores, or approximate unknown functions. For example, a neural network includes a model of interconnected artificial neurons (e.g., organized in layers) that communicate and learn to approximate complex functions and generate outputs (e.g., a set of suggested fonts) based on a plurality of inputs provided to the neural network. In some cases, a neural network refers to an algorithm (or a set of algorithms) that implements deep learning techniques to model high-level abstractions in data. A neural network (e.g., the classifier neural network 108) includes various layers such as an input layer, one or more hidden layers, and an output layer that each perform tasks for processing data. For example, a neural network includes a deep neural network, a convolutional neural network, a recurrent neural network (e.g., an LSTM), a graph neural network, or a large language model.

As further shown in FIG. 1, the server device(s) 102 also includes the combined font suggestion system 106 as part of a digital font system 104. For example, in one or more implementations, the digital font system 104 is able to store, generate, modify, edit, enhance, provide, distribute, and/or share digital fonts. For example, the digital font system 104 provides tools for the client device 114, via the client application 116, to receive font suggestions as generated by the classifier neural network 108. To illustrate, the digital font system 104 accesses or provides fonts as part of one or more digital content editing or generation operations.

In one or more embodiments, the server device(s) 102 includes all, or a portion of, the combined font suggestion system 106. For example, the combined font suggestion system 106 operates on the server device(s) 102 to generate a set of suggested fonts. In some cases, the combined font suggestion system 106 utilizes, locally on the server device(s) 102 or from another network location (e.g., the database 112), the classifier neural network 108 to generate the set of suggested fonts. To illustrate, the digital font system 104 at the server device(s) 102 utilize the combined font suggestion system 106 (including the classifier neural network 108) to determine suggested fonts matching (or similar to) a text region of a digital image.

In certain cases, the client device 114 includes all or part of the combined font suggestion system 106. For example, the client device 114 generates, obtains (e.g., downloads), or utilizes one or more aspects of the combined font suggestion system 106 from the server device(s) 102. Indeed, in some implementations, as illustrated in FIG. 1, the combined font suggestion system 106 is located in whole or in part on the client device 114. For example, the combined font suggestion system 106 includes a web hosting application that allows the client device 114 to interact with the server device(s) 102. To illustrate, in one or more implementations, the client device 114 accesses a web page supported and/or hosted by the server device(s) 102.

In one or more embodiments, the client device 114 and the server device(s) 102 work together to implement the combined font suggestion system 106. For example, in some embodiments, the server device(s) 102 train a classifier neural network (e.g., the classifier neural network 108) discussed herein and provides the classifier neural network to the client device 114 for implementation. In some embodiments, the client device 114 provides a digital image containing a text region, the server device(s) 102 determine the set of suggested fonts, and the client device 114 presents the set of suggested fonts. Furthermore, in some implementations, the client device 114 assists in generating the set of suggested fonts.

Although FIG. 1 illustrates a particular arrangement of the environment, in some embodiments, the environment has a different arrangement of components and/or may have a different number or set of components altogether. For instance, as mentioned, the combined font suggestion system 106 is implemented by (e.g., located entirely, or in part on) the client device 114. In addition, in one or more embodiments, the client device 114 communicates directly with the combined font suggestion system 106, bypassing the network 110. Further, in some embodiments, the classifier neural network 108 include one or more components stored in the database 112, maintained by the server device(s) 102, the client device 114, or a third-party device.

Figure 2:
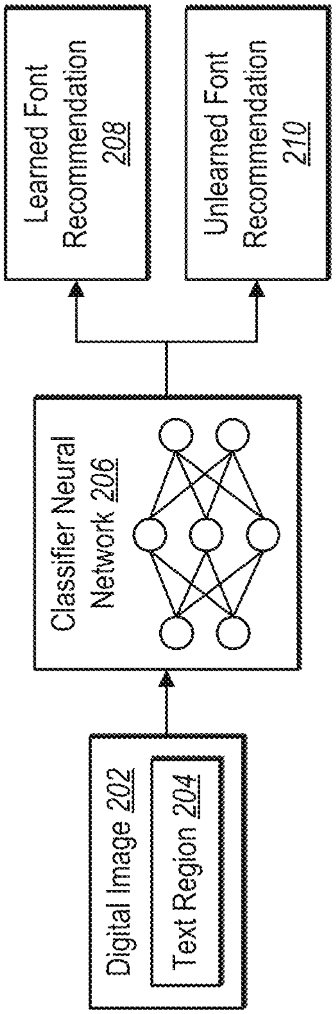
FIG. 2 illustrates a diagram of an overview of the combined font suggestion system generating one or more font recommendations from learned and/or unlearned fonts in accordance with one or more embodiments.

As mentioned, in one or more embodiments, the combined font suggestion system 106 generates one or more font recommendations in accordance with one or more embodiments. FIG. 2 illustrates an overview of generating one or more font recommendations including a learned font recommendation and/or an unlearned font recommendation in accordance with one or more embodiments. Additional detail regarding the various acts and processes mentioned with respect to FIG. 2 is provided thereafter with respect to subsequent FIGURES.

As illustrated in FIG. 2, the combined font suggestion system 106 receives a digital image 202 including a text region 204. In particular, the combined font suggestion system 106 receives the digital image 202 as a client device input (e.g., from the client device 114 of FIG. 1) to detect and/or match fonts in the digital image 202. In one or more embodiments, the combined font suggestion system 106 receives the digital image 202 and processes the digital image 202 as part of a request to search for text contained therein (e.g., the text region 204).

As further illustrated in FIG. 2, the combined font suggestion system 106 extracts the text region 204 from the digital image 202. In particular, the combined font suggestion system 106 locates one or more text regions within the digital image 202, including the text region 204. In one or more embodiments, the combined font suggestion system 106 extracts the text region 204 from the digital image 202 by editing or otherwise processing the digital image 202 (or a copy of the digital image 202) or the text region 204. To illustrate, the combined font suggestion system 106 extracts the text region 204 by cropping the digital image 202 to the text region 204.

As further illustrated in FIG. 2, the combined font suggestion system 106 feeds the text region 204 into the classifier neural network 206. In particular, the combined font suggestion system 106 utilizes the classifier neural network 206 to process the text region 204 to determine similar or matching fonts to the fonts contained in the text region 204. In one or more embodiments, the combined font suggestion system 106 utilizes the classifier neural network 206 to generate recommended fonts for the text region 204 based on learned classifiers and/or embedding vectors representing the digital image 202 and one or more fonts. In one or more embodiments, the combined font suggestion system 106 utilizes the classifier neural network 206 to match an image embedding vector for the text region 204 with one or more font embedding vectors representing one or more fonts to generate suggested fonts.

In some cases, an embedding vector includes a numerical representation of data in a feature space, such as a continuous vector space. For example, an embedding vector encodes high-dimensional data such as text into lower-dimensional form while preserving its structural relationship. In one or more embodiments, an embedding vector maps data such as image data by mapping embeddings with similar structure to points that are close together in vector space, enabling efficient recognition of similar image features.

As further illustrated in FIG. 2, the combined font suggestion system 106 utilizes the classifier neural network 206 to generate a learned font recommendation 208. In particular, the combined font suggestion system 106 generates the learned font recommendation 208 to suggest fonts from a font collection that are similar to the font of the text region based on learned classifiers and/or similarities of font embedding vectors for the learned fonts to an image embedding vector for the text region 204. In one or more embodiments, the combined font suggestion system 106 provides the learned font recommendation 208 based on a collection of fonts provided by a computer system or certain computer software (e.g., the default fonts provided by a word processing program).

As further illustrated in FIG. 2, the combined font suggestion system 106 utilizes the classifier neural network 206 to generate an unlearned font recommendation 210. In particular, the combined font suggestion system 106 generates the unlearned font recommendation 210 to suggest fonts locally stored on a client device that are similar to the font of the text region 204 based on similarities of the embedding vectors of the unlearned font to an image embedding vector for the text region 204. In one or more embodiments, the combined font suggestion system 106 provides the unlearned font recommendation 210 based on a collection of fonts locally stored on a device (e.g., fonts stored on a client device or custom fonts designed on the client device). As further described below, in one or more embodiments, the combined font suggestion system 106 provides a combination of learned font recommendations and unlearned font recommendations utilizing the classifier neural network 206.

Figure 3:
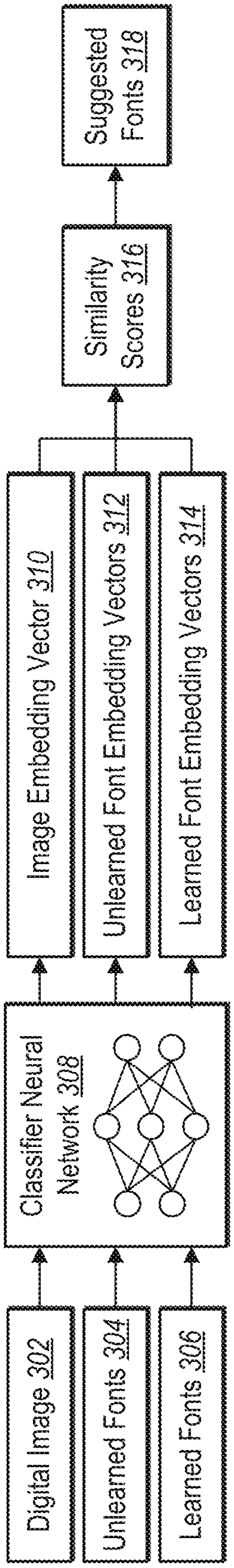
FIG. 3 illustrates a diagram of the combined font suggestion system generating similarity scores of embedding vectors to generate suggested fonts in accordance with one or more embodiments.

As mentioned, in one or more embodiments, the combined font suggestion system 106 generates similarity scores to determine a set of suggested fonts. FIG. 3 illustrates a diagram of utilizing a classifier neural network to generate embedding vectors to determine similarity scores and suggested fonts in accordance with one or more embodiments. Additional detail regarding the various acts and processes mentioned with respect to FIG. 3 is provided thereafter with respect to subsequent FIGURES.

As illustrated in FIG. 3, the combined font suggestion system 106 receives a digital image 302 and extracts a text region from the digital image 302 in response to a request to detect a font in the digital image 302. For example, the combined font suggestion system 106 receives a request to detect text in a text box in a digital flyer. In one or more embodiments, the combined font suggestion system 106 receives the digital image 302 by accessing a file uploaded by a client device. In one or more embodiments, the combined font suggestion system 106 receives the digital image 302 by accessing a file stored in a database (e.g., the database 112).

As further illustrated in FIG. 3, the combined font suggestion system 106 accesses a set of unlearned fonts 304. In particular, the combined font suggestion system 106 accesses the set of unlearned fonts 304 by accessing locally stored fonts that are not part of a larger font collection or database associated with a classifier neural network 308. In one or more embodiments, the combined font suggestion system 106 accesses the set of unlearned fonts 304 by accessing a catalog of fonts downloaded on a client device. In one or more embodiments, the combined font suggestion system 106 accesses the set of unlearned fonts 304 by accessing custom fonts designed and stored on a client device.

As further illustrated in FIG. 3, the combined font suggestion system 106 accesses a set of learned fonts 306. In particular, the combined font suggestion system 106 accesses the set of learned fonts 306 by accessing fonts that form part of a larger collection or database associated with the classifier neural network 308. In one or more embodiments, the combined font suggestion system 106 accesses the set of learned fonts 306 by accessing a font collection stored on a database (e.g., the database 112 of FIG. 1). For example, the learned fonts 306 correspond to a dataset for training the classifier neural network 308. In one or more embodiments, the combined font suggestion system 106 accesses the set of learned fonts 306 by accessing a catalog of fonts downloaded as part of a computer software or as part of a computer application (e.g., a word processing application or fonts included with a company's software).

As further illustrated in FIG. 3, the combined font suggestion system 106 utilizes the classifier neural network 308 to process the digital image 302, the set of unlearned fonts 304, and the set of learned fonts 306. In particular, the combined font suggestion system 106 utilizes the classifier neural network 308 to extract a set of embedding vectors corresponding to the text region of the digital image 302, the set of unlearned fonts 304, and the set of learned fonts 306. In one or more embodiments, the combined font suggestion system 106 instructs the classifier neural network 308 to access the set of unlearned fonts 304 and the set of learned fonts 306 by searching a client device and/or a database.

As further illustrated in FIG. 3, the combined font suggestion system 106 utilizes the classifier neural network 308 to generate an image embedding vector 310 representing at least a portion of the digital image 302. In particular, the combined font suggestion system 106 generates the image embedding vector 310 as a representation of the text region of the digital image 302. In one or more embodiments, the combined font suggestion system 106 utilizes the classifier neural network 308 to generate the image embedding vector 310 as a feature representation of the stylization of the font of the digital image 302 in a feature space for comparison with other fonts. For example, the combined font suggestion system 106 extracts the image embedding vector 310 from a layer of the classifier neural network 308 prior to a classification layer (e.g., from an output of a penultimate layer of the classifier neural network 308).

As further illustrated in FIG. 3, the combined font suggestion system 106 utilizes the classifier neural network 308 to generate a set of unlearned font embedding vectors 312. In particular, the combined font suggestion system 106 generates the set of unlearned font embedding vectors 312 as a representation of the set of unlearned fonts 304. In one or more embodiments, the combined font suggestion system 106 generates the set of unlearned font embedding vectors 312 as a feature representation of rendered images including text stylized according to fonts of the set of unlearned fonts 304 in a feature space (e.g., the same feature space as the image embedding vector 310) for comparison with the detected text in the digital image 302.

As further illustrated in FIG. 3, the combined font suggestion system 106 utilizes the classifier neural network 308 to generate a set of learned font embedding vectors 314. In particular, the combined font suggestion system 106 generates the set of learned font embedding vectors 314 as a representation of the set of learned fonts 306, or as a representation of a subset of the learned fonts 306. For example, the combined font suggestion system 106 generates the learned font embedding vectors 314 for a subset of fonts identified from the learned fonts 306 as being most similar to the detected text in the digital image 302 according to classifiers of the classifier neural network 308 trained on the learned fonts 306. In one or more embodiments, the combined font suggestion system 106 generates the set of learned font embedding vectors 314 as a feature representation of the stylization of the fonts of the set of learned fonts 306 (or a subset of the learned fonts 306) in the feature space for comparison with the detected text in the digital image 302 and/or the unlearned fonts 304.

As further illustrated in FIG. 3, the combined font suggestion system 106 generates a set of similarity scores 316. In particular, the combined font suggestion system 106 generates the set of similarity scores 316 by comparing the image embedding vector 310 to the set of unlearned font embedding vectors 312 and/or the set of learned font embedding vectors 314. In one or more embodiments, the combined font suggestion system 106 generates the set of similarity scores 316 by measuring distances between the image embedding vector 310 and the set of unlearned font embedding vectors 312 and/or distances between the image embedding vector 310 and the set of learned font embedding vectors 314 in the feature space. In one or more embodiments, the combined font suggestion system 106 generates the set of similarity scores 316 by calculating the cosine similarity of the image embedding vector 310 and the set of unlearned font embedding vectors 312. Additionally, in one or more embodiments, the combined font suggestion system 106 generates the set of similarity scores by calculating the cosine similarity of the image embedding vector 310 and the set of learned font embedding vectors 314.

As further illustrated in FIG. 3, the combined font suggestion system 106 utilizes the similarity scores 316 to generate a set of suggested fonts 318. In particular, the combined font suggestion system 106 generates the set of suggested fonts 318 to recommend fonts that match the style of font presented in the digital image 302. In one or more embodiments, the combined font suggestion system 106 generates the set of suggested fonts 318 by selecting at least one font from the set of unlearned fonts 304. In one or more additional embodiments, the combined font suggestion system 106 generates the set of suggested fonts 318 by selecting at least one font from the set of unlearned fonts and at least one font from the set of learned fonts 306. In particular, the combined font suggestion system 106 determines the font(s) (e.g., unlearned fonts and/or learned fonts) most similar to the font in the digital image 302 with the highest similarity scores from the set of similarity scores 316. As described in more detail with respect to FIG. 7, in some embodiments, the combined font suggestion system 106 re-ranks learned and unlearned fonts in a combined set of suggested fonts for providing better indications of font similarity.

Figure 4A:
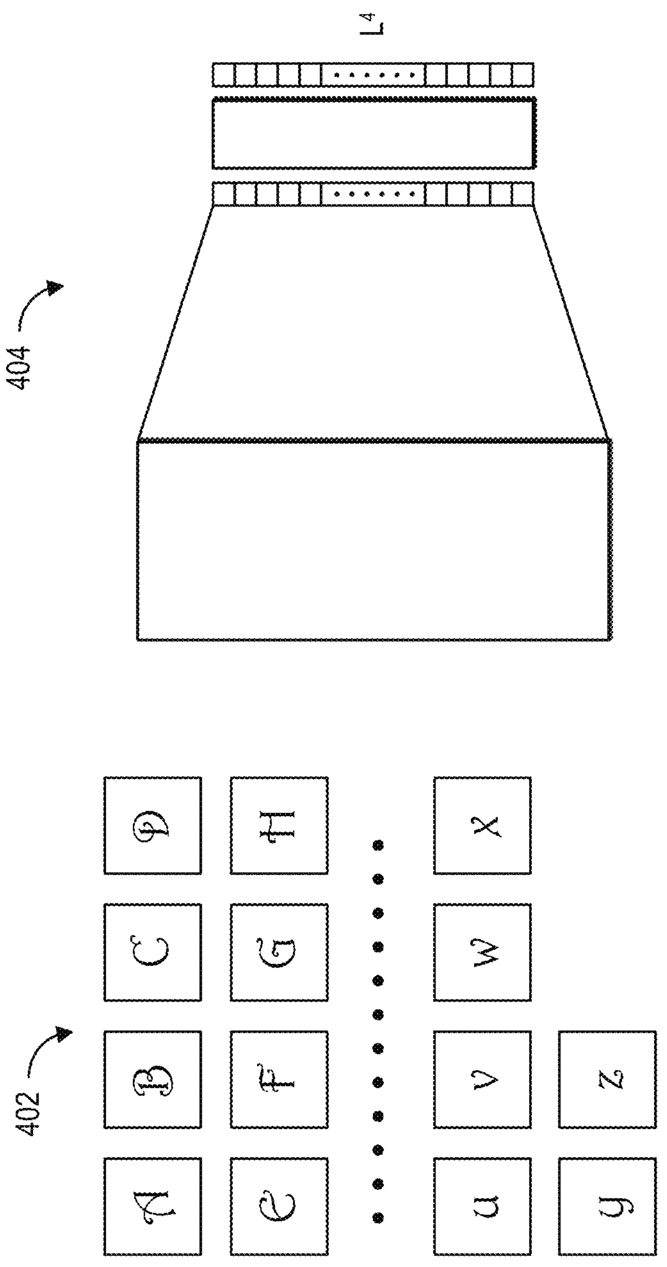
FIGS. 4A-4B illustrate diagrams of the combined font suggestion system extracting font embedding vectors from glyphs corresponding to specific fonts in accordance with one or more embodiments.
Figure 4B:
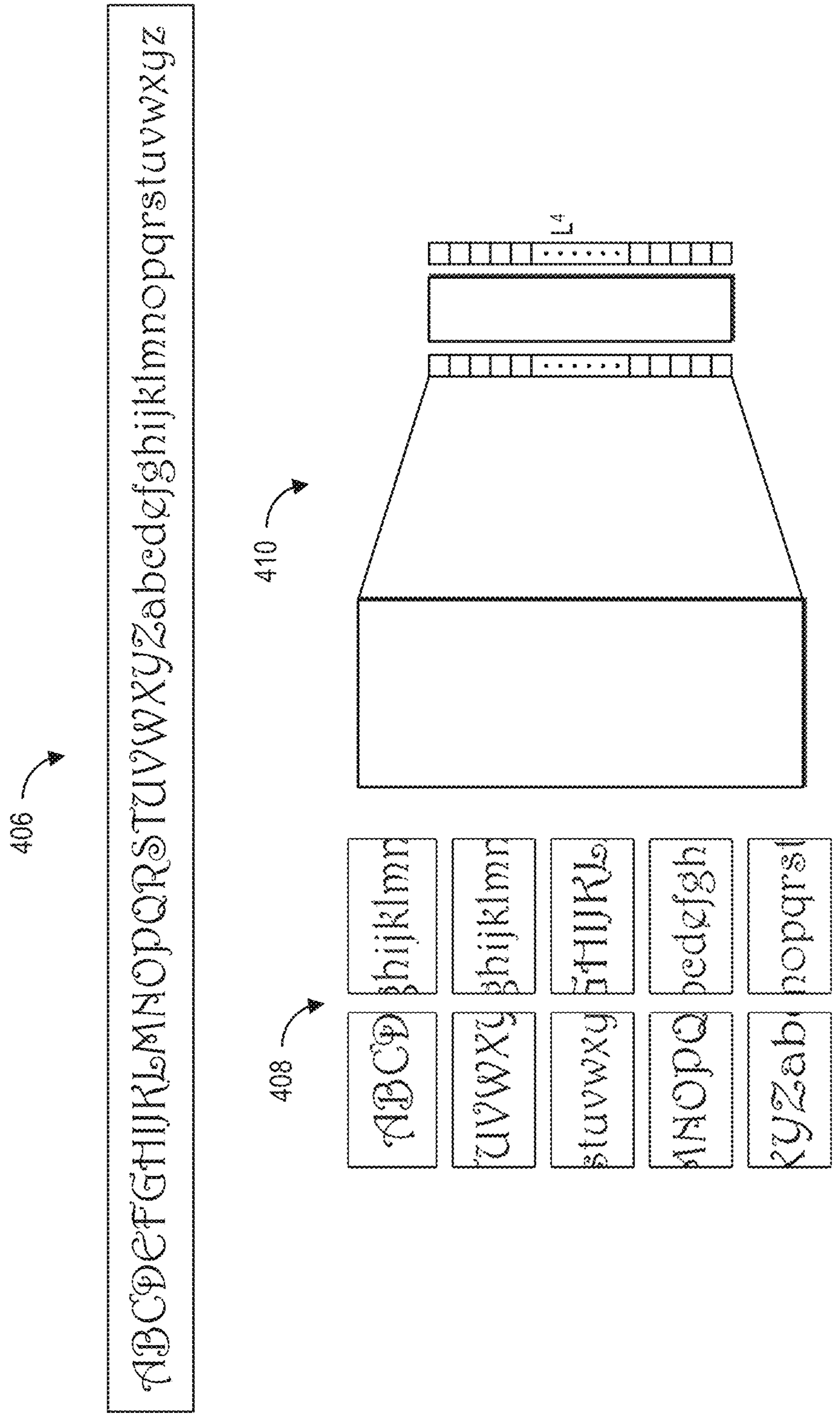

As mentioned, in one or more embodiments, the combined font suggestion system 106 extracts embedding vectors for fonts to generate suggested fonts. FIGS. 4A-4B illustrate diagrams of extracting embedding vectors corresponding to fonts utilizing a classifier neural network. Specifically, FIG. 4A illustrates an example diagram for extracting embedding vectors for individual glyphs from a font in accordance with one or more embodiments. FIG. 4B illustrates an example diagram for extracting embedding vectors for strings of glyphs from a font in accordance with one or more embodiments.

As illustrated in FIG. 4A, the combined font suggestion system 106 generates individual glyphs 402 styled according to a given font style. In particular, the combined font suggestion system 106 generates the individual glyphs 402 by rendering each letter of a given script (e.g., Latin script, Cyrillic script, Devanagari script) stylized according to a font (e.g., Helvetica, Aptos) as an individual glyph. In one or more embodiments, the combined font suggestion system 106 generates the individual glyphs 402 by rendering each letter of a given script in both capital and lowercase form as separate individual glyphs. In one or more embodiments, the combined font suggestion system 106 renders the individual glyphs 402 by rendering individual glyphs of each font on a canvas (e.g., in a separate rendered image for each glyph including black text against a white background).

As further illustrated in FIG. 4A, the combined font suggestion system 106 utilizes a classifier neural network 404 to extract a font embedding vector for a font based on the individual glyphs 402. In particular, the combined font suggestion system 106 utilizes the classifier neural network 404 to extract glyph embedding vectors corresponding to the separate rendered images of the individual glyphs 402. More specifically, a glyph embedding vector includes an embedding vector representing a rendered image of a single glyph for a particular font. In one or more embodiments, the combined font suggestion system 106, using the classifier neural network 404, extracts glyph embedding vectors for each of the individual glyphs 402 and averages the glyph embedding vectors to obtain the font embedding vector. In one or more embodiments, the combined font suggestion system 106 averages the glyph embedding vectors extracted for each of the individual glyphs 402 according to the following equation for N fonts:

$$E_f = \{E_n \mid n \in [1 \ldots N]\}$$

As illustrated in FIG. 4B, the combined font suggestion system 106 generates a combined rendered image 406 stylized according to a given font style. In particular, the combined font suggestion system 106 generates the combined rendered image 406 by rendering a full script (e.g., uppercase and lowercase alphabet glyphs and/or numerical glyphs) stylized according to a font (e.g., Times New Roman, Arial) in a single line. In one or more embodiments, the combined font suggestion system 106 generates the combined rendered image 406 by rendering all of the uppercase glyphs for a full script in the same line as all of the lowercase glyphs. In one or more alternative embodiments, the combined font suggestion system 106 generates the combined rendered image 406 by rendering all of the uppercase glyphs for a full script in one line and all of the lowercase glyphs for a full script in another line.

As further illustrated in FIG. 4B, in one or more embodiments, the combined font suggestion system 106 generates one or more crops 408 of the combined rendered image 406. In particular, the combined font suggestion system 106 generates the one or more crops 408 by randomly dividing the combined rendered image 406 into one or more portions, resulting in a plurality of separate rendered images including various glyphs or partial glyphs stylized according to the font. Accordingly, in various embodiments, the combined font suggestion system 106 generates a single rendered image or a plurality of rendered images including uppercase and/or lowercase glyphs stylized according to the font for extracting a font embedding vector.

As further illustrated in FIG. 4B, the combined font suggestion system 106 utilizes a classifier neural network 410 to extract a font embedding vector for a font. To illustrate, in one or more embodiments, the combined font suggestion system 106 extracts the font embedding vector from the combined rendered image 406 (e.g., by processing the combined rendered image 406 as a whole). In one or more additional embodiments, the combined font suggestion system 106 extracts separate embedding vectors corresponding to the one or more crops 408 and averages (e.g., by determining a mean) the separate embedding vectors to determine the font embedding vector. In further embodiments, the combined font suggestion system 106 extracts a plurality of separate embedding vectors corresponding to a rendered image including uppercase glyphs and a rendered image including lowercase glyphs and averages the separate embeddings to determine the font embedding vector.

In one or more embodiments, the combined font suggestion system 106 extracts font embedding vectors for N fonts as:

$$E_f = \{E_n \mid n \in [1 \ldots N]\}$$

Additionally, in one or more embodiments, the combined font suggestion system 106 caches the font embedding vectors for comparison to one or more image embedding vectors. In additional embodiments, the combined font suggestion system 106 stores font embedding vectors for later use with one or more additional digital images (e.g., to save on processing time utilizing the classifier neural network 410 instead of repeating feature extraction for subsequent font recommendation tasks).

Figure 5:
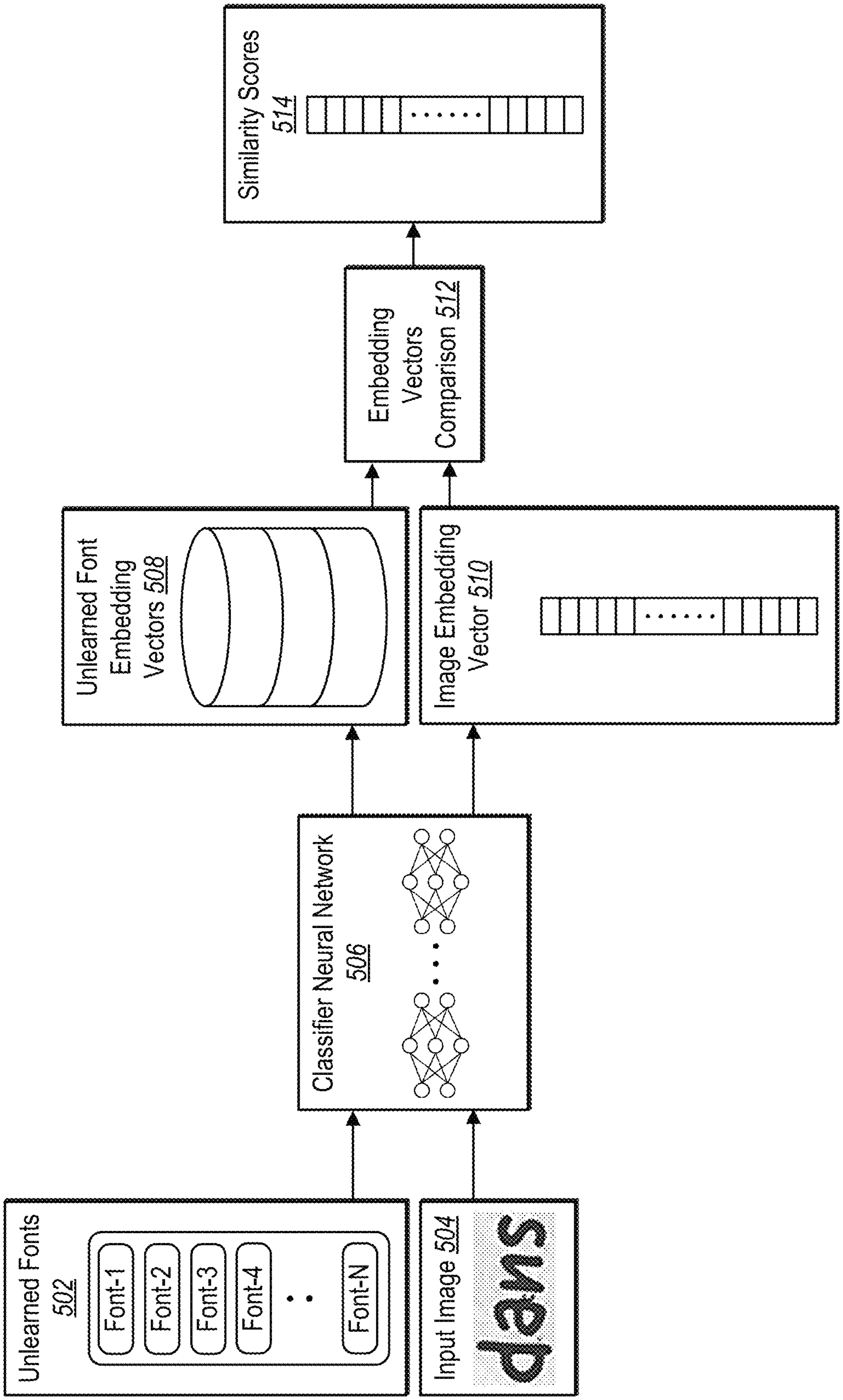
FIG. 5 illustrates a diagram of the combined font suggestion system generating similarity scores comparing an image embedding vector and font embedding vectors of unlearned fonts in accordance with one or more embodiments.

As mentioned, in one or more embodiments, the combined font suggestion system 106 generates similarity scores indicating font similarity of a set of fonts to detected text in a digital image. FIG. 5 illustrates a diagram of generating similarity scores comparing an image embedding vector corresponding to a text region of a digital image with unlearned font embedding vectors.

As illustrated in FIG. 5, the combined font suggestion system 106 accesses a set of unlearned fonts 502 (e.g., fonts that do not correspond to learned fonts for a classifier neural network). In particular, the combined font suggestion system 106 accesses the set of unlearned fonts 502 by searching a client device for locally stored fonts. In one or more embodiments, the combined font suggestion system 106 accesses the set of unlearned fonts 502 by accessing a set of fonts accessible via the internet.

As further illustrated in FIG. 5, the combined font suggestion system 106 receives an input image 504. In particular, the combined font suggestion system 106 receives the input image 504 by extracting a text region from a digital image, for example, in response to a request to extract and analyze a specified text region of the digital image. To illustrate, the request includes a request to match detected text in the digital image to one or more fonts in a set of locally stored fonts (or fonts otherwise unlearned in relation to a classifier neural network).

As further illustrated in FIG. 5, the combined font suggestion system 106 utilizes a classifier neural network 506 to process the set of unlearned fonts 502 and the input image 504. In particular, the combined font suggestion system 106 utilizes the classifier neural network 506 to extract an image embedding vector corresponding to the input image 504 and a plurality of font embedding vectors from the set of unlearned fonts 502. In one or more embodiments, the combined font suggestion system 106 directs the classifier neural network to access the set of unlearned fonts 502 and generate an image embedding vector corresponding to the input image 504 and font embedding vectors corresponding to the set of unlearned fonts 502 as described in relation to FIGS. 4A-4B.

For example, the combined font suggestion system 106 generates a set of unlearned font embedding vectors 508 for the unlearned fonts 502 using the classifier neural network 506. In particular, the combined font suggestion system 106 generates the unlearned font embedding vectors 508 to represent a set of glyphs (e.g., alphanumeric glyphs) stylized according to the each of the fonts in the set of unlearned fonts 502 in a feature space. In one or more embodiments, the combined font suggestion system 106 generates the unlearned font embedding vectors 508 according to the method described in FIGS. 4A-4B. In one or more embodiments, the combined font suggestion system 106 determines the font embedding vectors by determining an embedding generated by a penultimate layer of the classifier neural network 506.

As further illustrated in FIG. 5, the combined font suggestion system 106 generates an image embedding vector 510. In particular, the combined font suggestion system 106 generates the image embedding vector 510 to represent the input image 504 in a feature space. For example, the feature space of the image embedding vector 510 is the same feature space as the font embedding vectors (e.g., in FIG. 4A-4B). In one or more embodiments, the combined font suggestion system 106 generates the image embedding vector 510 by extracting an embedding generated by a penultimate layer of the classifier neural network 506.

As further illustrated in FIG. 5, the combined font suggestion system 106 performs an embedding vectors comparison 512. In particular, the combined font suggestion system 106 performs the embedding vectors comparison 512 to evaluate the distances between the set of unlearned font embedding vectors 508 and the image embedding vector 510. In one or more embodiments, the combined font suggestion system 106 generates the embedding vectors comparison 512 by comparing each one of the unlearned font embedding vectors 508 with the image embedding vector 510 to determine which of the unlearned font embedding vectors 508 is closest in the feature space to the image embedding vector 510. In one or more embodiments, the combined font suggestion system 106 performs the embedding vectors comparison 512 by determining a cosine similarity distance according to the following equation for comparing two feature vectors (e.g., two embedding vectors), $E_i$ and $E_j$:

$$d(i, j) \triangleq \frac{E_i E_j}{\|E_i\| \|E_j\|}$$

Further, in one or more embodiments, the combined font suggestion system 106 generates a similarity vector to the image embedding vector 510 as part of the embedding vectors comparison 512. In particular, the combined font suggestion system 106 utilizes the following equation for generating a similarity vector to the image embedding vector 510 represented as Et with n as the index of an nth unlearned font embedding vector (e.g., one of the unlearned font embedding vectors 508):

$$D = \{d(t, n) \mid n \in [1 \ldots N]\}$$

As further illustrated in FIG. 5, the combined font suggestion system 106 utilizes the embedding vectors comparison 512 to generate a set of similarity scores 514. In particular, the combined font suggestion system 106 generates the set of similarity scores 514 according to how closely the unlearned font embedding vectors 508 are to the image embedding vector 510. To illustrate, the similarity scores 514 reflect how similar in design one or more of the unlearned fonts 502 are in comparison to the input image 504 based on learned features by the classifier neural network 506.

Figure 6:
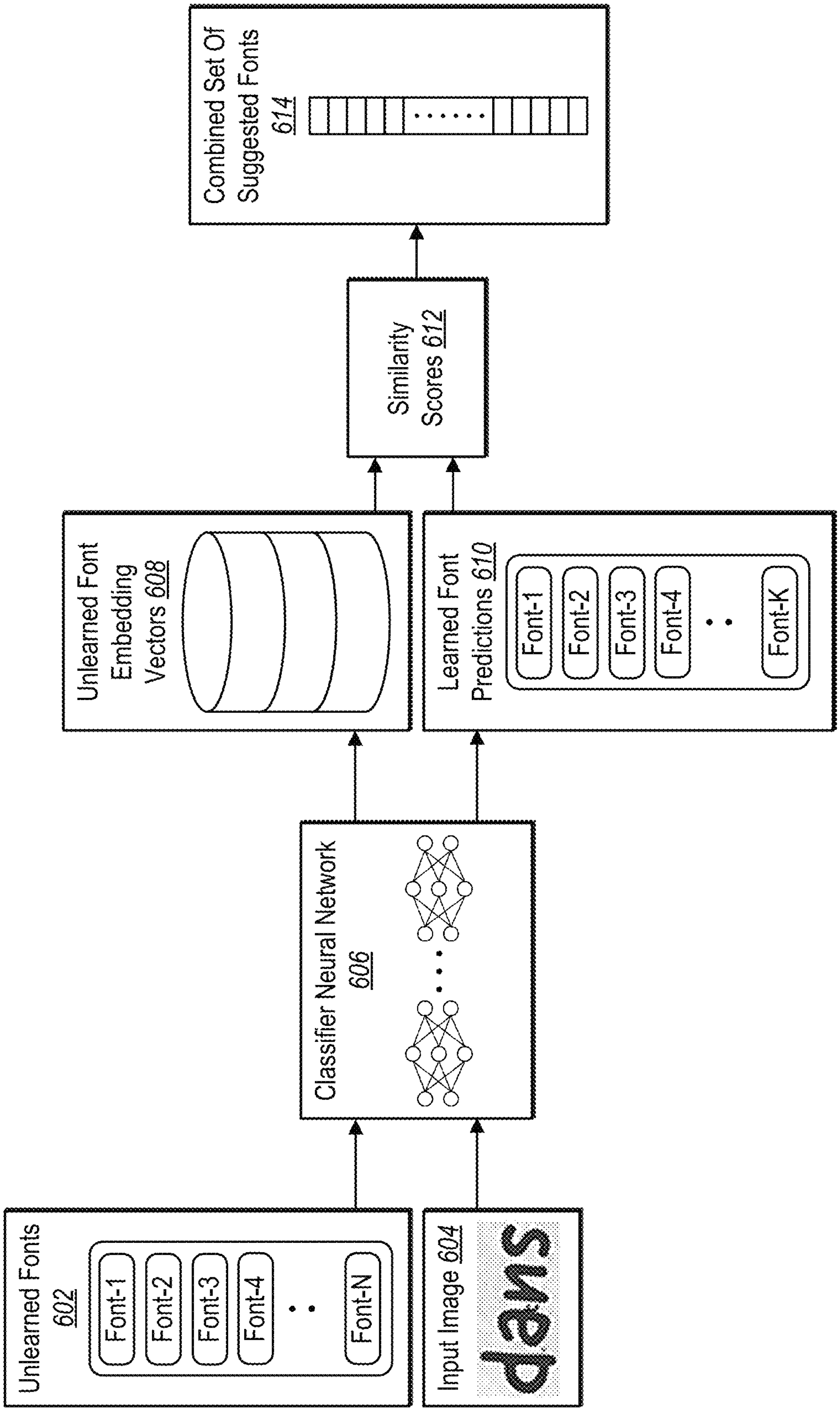
FIG. 6 illustrates a diagram of the combined font suggestion system generating a combined set of suggested fonts by comparing an image embedding vector with font embedding vectors of unlearned fonts and learned fonts in accordance with one or more embodiments.

As mentioned, in one or more embodiments, the combined font suggestion system 106 generates a combined set of suggested fonts including learned and unlearned fonts in accordance with one or more embodiments. FIG. 6 illustrates an overview of generating a combined set of suggested fonts by comparing a set of unlearned font embedding vectors and a set of learned font predictions to a text region of a digital image in accordance with one or more embodiments.

As illustrated in FIG. 6, the combined font suggestion system 106 accesses a set of unlearned fonts 602 and an input image 604. In particular, the combined font suggestion system 106 accesses the set of unlearned fonts 602 by extracting one or more fonts downloaded locally on a client device. In one or more embodiments, the combined font suggestion system 106 accesses the input image 604 by extracting a text region from a digital image accessed from either a client device or a collection of digital images stored on a database (e.g., the database 112 of FIG. 1).

As further illustrated in FIG. 6, the combined font suggestion system 106 utilizes a classifier neural network 606 to process the set of unlearned fonts 602 by generating a set of unlearned font embedding vectors 608 corresponding to the set of unlearned fonts 602. In one or more embodiments, the combined font suggestion system 106 additionally generates a set of learned font predictions 610 to predict one or more learned fonts that match or are similar to the font in the input image 604. For example, the combined font suggestion system 106 utilizes the classifier neural network 606 to access a set of learned fonts for which the classifier neural network 606 is trained, such as a set of fonts stored in an application (e.g., a word processor) or a database (e.g., the database 112) and select one or more learned fonts with similar stylization to the font depicted in the input image 604. Accordingly, in one or more embodiments, the combined font suggestion system 106 determines a subset of learned fonts for the text in the input image 604 by selecting a number of learned fonts based on the learned font predictions 610 (e.g., classifications) generated by the classifier neural network 606 for the input image 604.

In one or more embodiments, the combined font suggestion system 106 uses the learned font predictions 610 to extract a series of one or more embedding vectors for a subset of learned fonts indicated by the learned font predictions 610, e.g., as described in relation to FIGS. 4A-4B. In particular, the combined font suggestion system 106 generates or accesses font embedding vectors for the learned font predictions 610 in response to determining the learned font predictions 610 for the input image 604. For instance, the combined font suggestion system 106 generates the font embedding vectors for the learned font predictions 610 in response to selecting the subset of learned fonts utilizing the classifier neural network 606. Alternatively, the combined font suggestion system 106 generates font embedding vectors for all learned fonts during (or after) training of the classifier neural network 606 and prior to processing digital images for matching fonts. Accordingly, the combined font suggestion system 106 determines font embedding vectors for the subset of learned fonts for use in generating a combined set of suggested fonts including both learned and unlearned fonts.

As further illustrated in FIG. 6, the combined font suggestion system 106 generates a set of similarity scores 612 comparing the unlearned font embedding vectors 608 and the font embedding vectors of the subset of learned fonts indicated by the learned font predictions 610 to the image embedding vector of the input image 604. In particular, the combined font suggestion system 106 computes the similarity scores 612 by calculating the distance between both the unlearned font embedding vectors 608 and the font embedding vectors of the subset of learned fonts and the image embedding vector corresponding to the input image 604. In one or more embodiments, the combined font suggestion system 106 calculates the cosine similarity distance between the embedding vectors according to the formulas outlined in FIG. 5.

As further illustrated in FIG. 6, the combined font suggestion system 106 generates a combined set of suggested fonts 614 including learned and/or unlearned fonts. In particular, the combined font suggestion system 106 generates the combined set of suggested fonts 614 by utilizing the similarity scores 612 to rank the fonts included in the set of unlearned fonts 602 and the subset of learned fonts by how closely they resemble the font included in the input image 604. In one or more embodiments, the combined font suggestion system 106 generates the combined set of suggested fonts by ranking the similarity scores 612 of the subset of learned fonts and the set of unlearned fonts 602 from highest to lowest values. In one or more embodiments, the combined set of suggested fonts 614 presents (e.g., for display at a client device) two separate lists of suggested fonts ranked by similarity to the font in the input image 604, with one list including the set of unlearned fonts 602 and the other list including the subset of learned fonts. In one or more embodiments, the combined set of suggested fonts 614 includes a single combined list of suggested fonts ranked by similarity to the font of the input image 604, combining both the set of unlearned fonts 602 and the subset of learned fonts.

Figure 7:
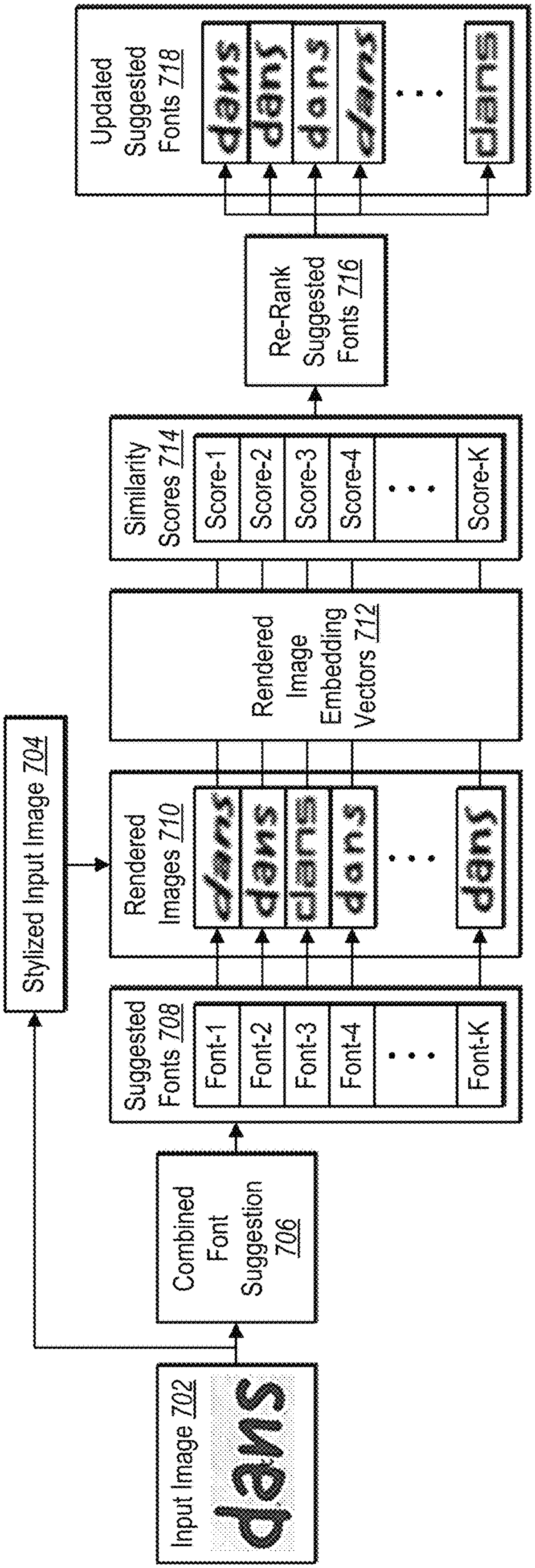
FIG. 7 illustrates a diagram of the combined font suggestion system re-ranking a combined set of suggested fonts to generate an updated list of suggested fonts in accordance with one or more embodiments.

As mentioned, in one or more embodiments, the combined font suggestion system 106 re-ranks the suggested fonts to generate an updated list of suggested fonts in accordance with one or more embodiments. FIG. 7 illustrates an overview of generating updated suggested fonts by re-ranking the originally suggested fonts.

As illustrated in FIG. 7, the combined font suggestion system 106 receives an input image 702 and a combined font suggestion 706. In particular, the combined font suggestion system 106 generates the combined font suggestion 706 (e.g., as described in relation to FIG. 6) by determining an initial suggestion of both learned and unlearned fonts similar to the text of the input image 702, such as the set of suggested fonts 708. In one or more embodiments, as mentioned, the combined font suggestion system 106 generates the set of suggested fonts 708 as a single list of both learned and unlearned fonts or as separate lists, with one list of learned fonts and another list of unlearned fonts.

As further illustrated in FIG. 7, the combined font suggestion system 106 generates a stylized input image 704 for each of the suggested fonts 708. In particular, the combined font suggestion system 106 generates the stylized input image 704 by running a text recognition system on the input image 702 to insert the same text contained in the input image 702 (e.g., “dans” as illustrated in FIG. 7) stylized according to a particular font form the suggested fonts 708 against a background canvas. In one or more embodiments, the combined font suggestion system 106 generates the stylized input image 704 by rendering the text contained in the input image in the particular font with a black (or dark) color against a white canvas and with a predetermined font size.

As further illustrated in FIG. 7, the combined font suggestion system 106 utilizes the stylized input image 704 for each of the suggested fonts 708 to generate one or more rendered images 710. In particular, the combined font suggestion system 106 generates the one or more rendered images 710 by rendering the text of the stylized input image 704 in the style of the one or more fonts suggested by the set of suggested fonts 708 as separate images. In one or more embodiments, the combined font suggestion system 106 generates the one or more rendered images 710 by storing the text from the stylized input image 704 with a particular resolution and/or image size centering the text in the various fonts against the background.

As further illustrated in FIG. 7, the combined font suggestion system 106 generates a set of rendered image embedding vectors 712 for the one or more rendered images 710. In particular, the combined font suggestion system 106 utilizes a classifier neural network to generate the set of rendered image embedding vectors 712 from the one or more rendered images 710. In one or more embodiments, the combined font suggestion system 106 also generates a set of similarity scores 714 from the rendered image embedding vectors 712 (e.g., as described in relation to FIGS. 5-6) to compare the rendered image embedding vectors 712 with the image embedding vector of the input image 702.

As further illustrated in FIG. 7, the combined font suggestion system 106 re-ranks suggested fonts 716 based on the similarity scores 714 to generate a set of updated suggested fonts 718. In particular, the combined font suggestion system 106 re-ranks suggested fonts 716 by ranking the set of suggested fonts 708 according to the similarity scores 714 determined using the rendered image embedding vectors 712. For example, the combined font suggestion system 106 uses the similarity scores 714 to re-rank the learned fonts and unlearned fonts based on representations of the detected text in the input image 702 to indicate the ordered similarity of the respective rendered image embedding vectors 712 to the image embedding vector of the input image 702. Thus, the combined font suggestion system 106 determines an initial order of suggested fonts and re-ranks the suggested fonts to present the most similar fonts as the updated suggested fonts 718 based on text configurations of the suggested fonts similar to the input image 702 for improved accuracy.

Figure 8:
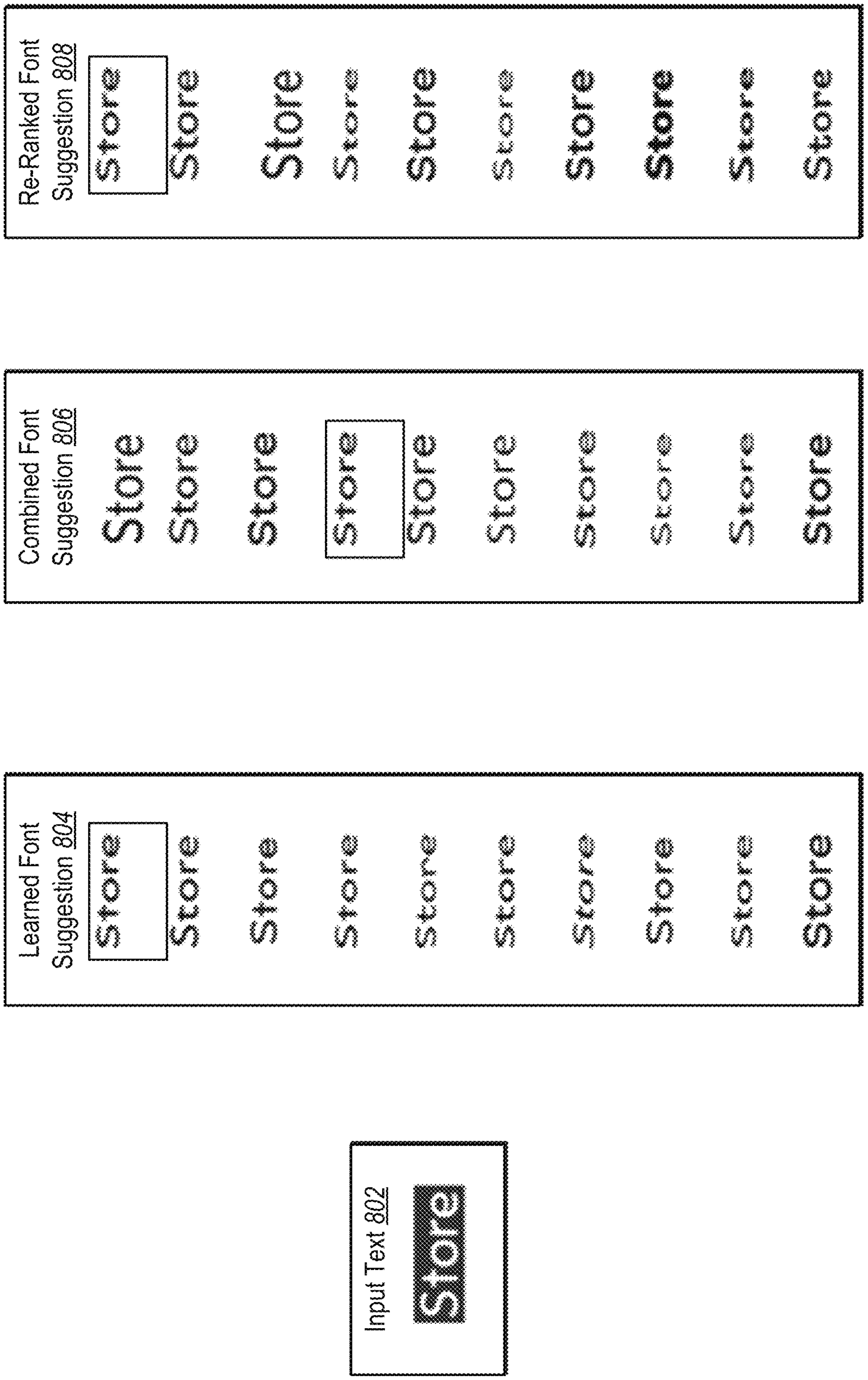
FIG. 8 illustrates an example display of the combined font suggestion system re-ranking a combined set of suggested fonts based on an input text in accordance with one or more embodiments.

FIG. 8 illustrates examples of one or more ranked lists of suggested fonts before and after re-ranking according to the operations described above in relation to FIG. 7. In particular, as illustrated in FIG. 8, the combined font suggestion system 106 displays the input text 802 as a reference. The combined font suggestion system 106 generates the learned font suggestion 804 including a plurality of learned fonts based on initial predictions generated by a classifier neural network for the input text 802. In particular, the combined font suggestion system 106 displays the learned font suggestion 804 to represent an initial ranked set of suggested learned fonts (e.g., the learned font predictions 610 of FIG. 6), with the font located nearest the top of the box as the font identified as most likely to match the font of the input text based on initial similarity scores. Furthermore, as illustrated in the embodiment of FIG. 8, the highest ranked font in the learned font suggestion 804 corresponds to the font displayed in the input text 802, as indicated by the box enclosing the highest ranked font.

As further illustrated in FIG. 8, the combined font suggestion system 106 displays a combined font suggestion 806. In particular, the combined font suggestion system 106 generates the combined font suggestion 806 (e.g., as described in relation to FIG. 6), which includes a ranked set of both suggested learned fonts and suggested unlearned fonts with the highest similarity to the input text 802 according to a set of similarity scores. As illustrated, the highest ranked font in the combined font suggestion 806 does not correspond to the font displayed in the input text

802, but is instead listed in the fourth spot of the combined font suggestion 806. Accordingly, in some embodiments, the combined font suggestion 806 including both learned and unlearned fonts initially determined by the combined font suggestion system 106 does not have the font most similar to the font in the input text 802 ranked at the top of the list.

In one or more embodiments, the combined font suggestion system 106 re-ranks the combined font suggestion 806 to instead provide the most similar fonts at the top of the list. Accordingly, as further illustrated in FIG. 8, the combined font suggestion system 106 generates and displays a re-ranked font suggestion 808. In particular, the combined font suggestion system 106 generates the re-ranked font suggestion 808 by determining updated similarity scores using rendered images for each of the fonts in the combined font suggestion 806 according to input text 802, as described above with respect to FIG. 7. In one or more embodiments, the combined font suggestion system 106 displays the re-ranked font suggestion 808 as a re-ranked set of both suggested learned fonts and suggested unlearned fonts. Furthermore, as illustrated, the highest ranked font in the re-ranked font suggestion 808 corresponds to the font displayed in the input text 802, resulting in a list of font suggestions ordered based on their similarity to the input text 802.

In some embodiments, the combined font suggestion system 106 selects a predetermined number of fonts (e.g., the top-K fonts) from the re-ranked font suggestion 808 to provide for display via a client device. In one or more embodiments, the combined font suggestion system 106 provides the top font suggestion in connection with one or more font matching operations. In one or more additional embodiments, the combined font suggestion system 106 provides different numbers of font suggestions depending on the particular implementation (e.g., different numbers of font suggestions for a first application and a second application or for mobile devices and desktop devices).

By performing the re-ranking process illustrated in FIG. 7. the combined font suggestion system 106 generates suggested lists of fonts in ranked order with improved accuracy. As displayed below in Table 1, the combined font suggestion system 106 generates ranked lists of unlearned fonts with greater accuracy than DeepFont, a conventional system:

| Accuracy | | | |
|---|---|---|---|
| Model Name | Top-1 | Top-3 | Top-10 |
| DeepFont | <<0.01 | <<0.01 | 0.01 |
| Combined font suggestion system | 0.705 | 0.854 | 0.933 |

As further displayed below in Table 2, the combined font suggestion system 106 also generates ranked lists of suggested unlearned fonts and learned fonts with greater accuracy than a set of only unlearned fonts.

| Unlearned Fonts Accuracy | | | | | | |
|---|---|---|---|---|---|---|
| Method | Top-1 | Top-2 | Top-3 | Top-4 | Top-5 | Top-10 |
| Unlearned Font Recommendations: | 0.7389 | 0.8302 | 0.8644 | 0.8838 | 0.8981 | 0.9274 |
| Combined font suggestion system: | 0.8156 | 0.8789 | 0.8989 | 0.9097 | 0.9202 | 0.9413 |

As further displayed below in Table 3, the combined font suggestion system 106 generates ranked lists of suggested unlearned fonts and learned fonts with greater accuracy than a set of only learned fonts.

| Learned Fonts Accuracy | | | | | | |
|---|---|---|---|---|---|---|
| Method | Top-1 | Top-2 | Top-3 | Top-4 | Top-5 | Top-10 |
| Learned Font Recommendations: | 0.8228 | 0.9132 | 0.9387 | 0.9474 | 0.9532 | 0.9647 |
| Combined font suggestion system: | 0.8745 | 0.9405 | 0.9529 | 0.9591 | 0.9617 | 0.9662 |

As further displayed below in Table 4, in one or more embodiments, re-ranking a set of combined font suggestions including learned and unlearned fonts results in an ordered list of suggestions with greater accuracy than an initial combined set of suggested fonts.

| Combined Fonts Accuracy | | | | | | |
|---|---|---|---|---|---|---|
| Method | Top-1 | Top-2 | Top-3 | Top-4 | Top-5 | Top-10 |
| Combined Font Recommendations: | 0.7124 | 0.8516 | 0.8921 | 0.9031 | 0.9146 | 0.9341 |
| Combined font suggestion system: | 0.7735 | 0.8916 | 0.9121 | 0.9201 | 0.9251 | 0.9341 |

Figure 9:
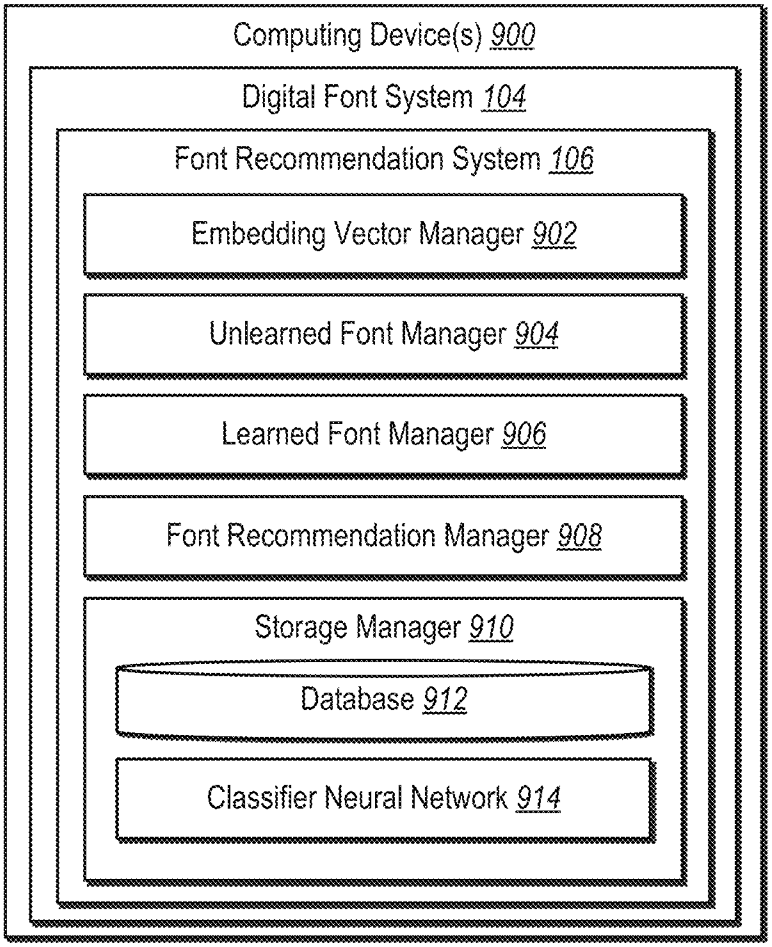
FIG. 9 illustrates an example schematic diagram of a combined font suggestion system in accordance with one or more embodiments.

Referring now to FIG. 9, additional detail will be provided regarding components and capabilities of the combined font suggestion system 106. Specifically, FIG. 9 illustrates an example schematic diagram of the combined font suggestion system 106 on example computing device(s) 900 (e.g., one or more of the client device 114 and the server device(s) 102 of FIG. 1). As shown in FIG. 9, the combined font suggestion system 106 includes an embedding vector manager 902, an unlearned font manager 904, a learned font manager 906, a font recommendation manager 908, and a storage manager 910.

As mentioned, the combined font suggestion system 106 includes an embedding vector manager 902. In particular, the embedding vector manager 902 generates or extracts embedding vectors (e.g., the digital text embedding vectors 310, the unlearned font embedding vectors 312, or the learned font embedding vectors 314 of FIG. 3, or the rendered image embedding vectors 712 of FIG. 7). For example, the embedding vector manager 902 extracts embedding vectors for a text region of a digital image, for a set of unlearned fonts, for a set of learned fonts, and a set of rendered images.

As mentioned, the combined font suggestion system 106 further includes an unlearned font manager 904. In particular, the unlearned font manager 904 accesses, downloads, or maintains a set of unlearned fonts (e.g., the unlearned fonts 502). For example, the unlearned font manager 904 accesses a set of unlearned fonts locally stored on a client device (e.g., the client device 114) to compare to a region of an uploaded digital image that includes text.

As mentioned, the combined font suggestion system 106 further includes a learned font manager 906. In particular, the learned font manager 906 accesses, downloads, or maintains a set of learned fonts (e.g., the learned fonts 306). For example, the learned font manager 906 accesses a set of learned fonts used to train a classifier neural network and stored on a database (e.g., the database 112) or as part of an application (e.g., a word processing application) to compare to a region of an uploaded digital image that includes text.

As mentioned, the combined font suggestion system 106 further includes a font recommendation manager 908. In particular, the font recommendation manager 908 generates, modifies, alters, or re-ranks one or more sets of font recommendations (e.g., the font suggestions depicted in FIG. 8). For example, the font recommendation manager 908 generates a ranked set of suggested fonts that match or resemble a font identified in a digital image based on learned fonts and/or unlearned fonts.

As mentioned, the combined font suggestion system 106 further includes a storage manager 910. The storage manager 910 operates in conjunction with the other components of the combined font suggestion system 106 and includes one or more memory devices such as the database 912 (e.g., the database 112) that stores various data such as digital images, sets of unlearned fonts, sets of learned fonts, and other information. In some cases, the storage manager 910 also manages or maintains a classifier neural network 914 for generating ranked sets of suggested fonts using one or more components of the combined font suggestion system 106 as described above.

In one or more embodiments, each of the components of the combined font suggestion system 106 are in communication with one another using any suitable communication technologies. Additionally, the components of the combined font suggestion system 106 are in communication with one or more devices including one or more client devices described above. It will be recognized that although the components of the combined font suggestion system 106 are shown to be separate in FIG. 9, any of the subcomponents may be combined into fewer components, such as into a single component, or divided into more components as may serve a particular implementation. Furthermore, although the components of FIG. 9 are described in connection with the combined font suggestion system 106, at least some of the components for performing operations in conjunction with the combined font suggestion system 106 described herein may be implemented on other devices within the environment.

The components of the combined font suggestion system 106 include software, hardware, or both. For example, the components of the combined font suggestion system 106 include one or more instructions stored on a computer-readable storage medium and executable by processors of one or more computing devices (e.g., the computing device(s) 900). When executed by the one or more processors, the computer-executable instructions of the combined font suggestion system 106 cause the computing device(s) 900 to perform the methods described herein. Alternatively, the components of the combined font suggestion system 106 comprise hardware, such as a special purpose processing device to perform a certain function or group of functions. Additionally, or alternatively, the components of the combined font suggestion system 106 include a combination of computer-executable instructions and hardware.

Furthermore, the components of the combined font suggestion system 106 performing the functions described herein may, for example, be implemented as part of a stand-alone application, as a module of an application, as a plug-in for applications including content management applications, as a library function or functions that may be called by other applications, and/or as a cloud-computing model. Thus, the components of the combined font suggestion system 106 may be implemented as part of a stand-alone application on a personal computing device or a mobile device. Alternatively, or additionally, the components of the combined font suggestion system 106 may be implemented in any application that allows creation and delivery of content to users, including, but not limited to, applications such as ADOBE® ACROBAT®, ADOBE® PHOTOSHOP®, and ADOBE® ILLUSTRATOR®, which are either registered trademarks or trademarks of Adobe Inc. in the United States and/or other countries.

FIGS. 1-9, the corresponding text, and the examples provide a number of different systems, methods, and non-transitory computer readable media for generating suggested fonts corresponding to a text region of a digital image. In addition to the foregoing, embodiments are described in terms of flowcharts comprising acts for accomplishing a particular result. For example, FIG. 10 illustrates a flowchart of example sequences or series of acts in accordance with one or more embodiments.

Figure 10:
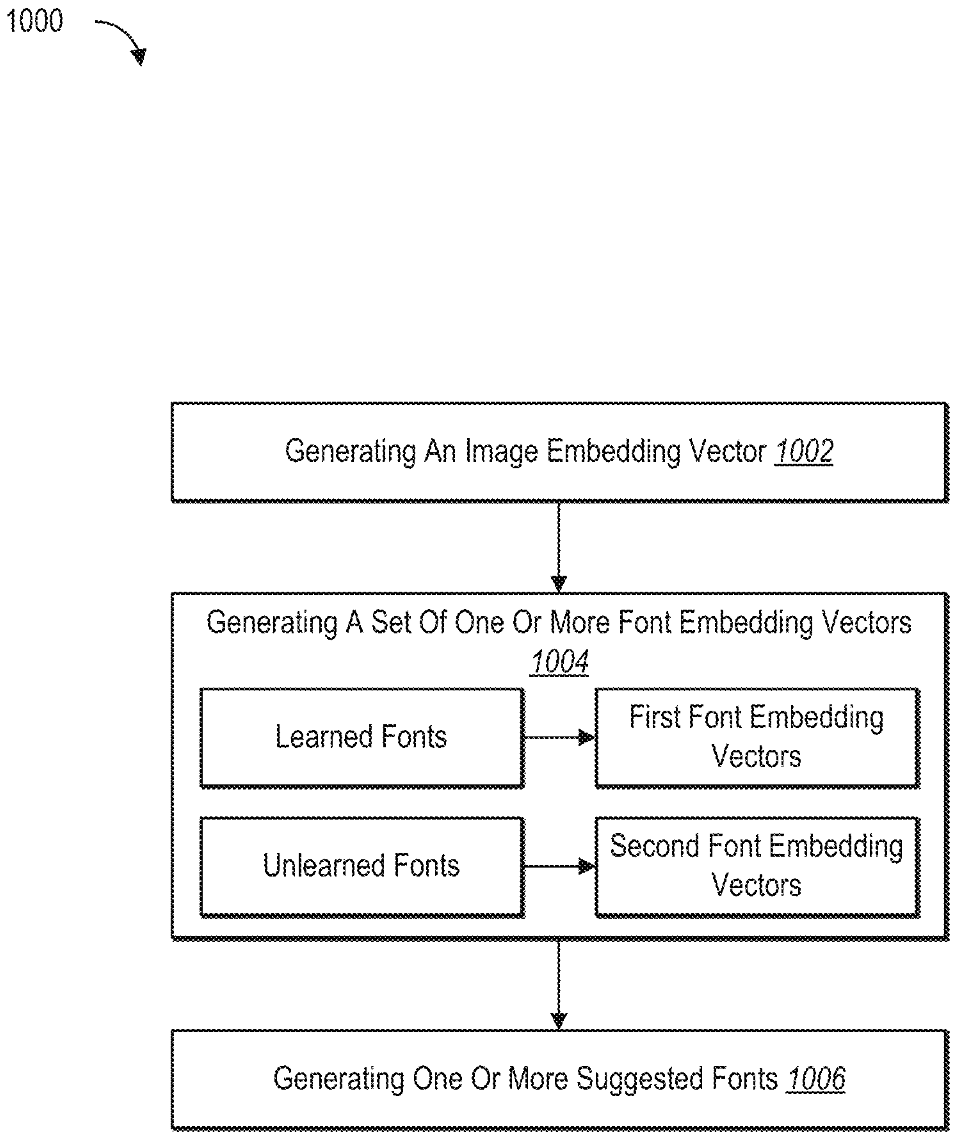
FIG. 10 illustrates an example flowchart of a series of acts for generating suggested fonts utilizing a classifier neural network and font embedding vectors in accordance with one or more embodiments.

While FIG. 10 illustrates acts according to particular embodiments, alternative embodiments may omit, add to, reorder, and/or modify any of the acts shown in FIG. 10. In one or more embodiments, the acts of FIG. 10 are performed as part of a method. Alternatively, a non-transitory computer readable medium comprises instructions, that when executed by one or more processors, cause a computing device to perform the acts of FIG. 10. In still further embodiments, a system performs the acts of FIG. 11. Additionally, the acts described herein may be repeated or performed in parallel with different instances of the same or similar acts.

FIG. 10 illustrates an example series of acts 1000 for generating one or more suggested fonts. In particular, the series of acts 1000 includes an act 1002 of generating an image embedding vector. For example, the act 1002 involves utilizing a classifier neural network to generate an embedding vector for a text region of a digital image. Further, the series of acts 1000 includes an act 1004 of generating a set of one or more font embedding vectors. For example, the act 1004 involves generating a first set of font embedding vectors for a set of learned fonts and a second set of font embedding vectors for a set of unlearned fonts using a classifier neural network. Further, the series of acts 1000 includes an act 1006 of generating one or more suggested fonts. For example, the act 1006 includes comparing the image embedding vector to the one or more font embedding vectors to determine the font that most closely matches the text region of the digital image and generating a suggested list of matching fonts.

In some embodiments, the series of acts 1000 includes extracting the portion of the digital image comprising the digital text from the digital image by cropping the digital image to a cropped portion of the digital image comprising the digital text. The series of acts 1000 also includes generating, utilizing the classifier neural network, the image embedding vector for the cropped portion of the digital image.

In some embodiments, the series of acts 1000 includes generating one or more rendered images of a plurality of glyphs stylized according to an unlearned font of the set of the one or more unlearned fonts. The series of acts 1000 also includes generating, utilizing the classifier neural network, the one or more font embedding vectors from the one or more rendered images of the plurality of glyphs.

In some embodiments, the series of acts 1000 includes generating a plurality of glyph embedding vectors corresponding to separate glyphs stylized according to an unlearned font of the set of one or more unlearned fonts. The series of acts 1000 also includes generating, utilizing the classifier neural network, a font embedding vector for the unlearned font by averaging the plurality of glyph embedding vectors.

In some embodiments, the series of acts 1000 includes generating a rendered image comprising glyphs stylized according to an unlearned font of the set of one or more unlearned fonts in a first color on a background of a second color. The series of acts 1000 also includes generating, utilizing the classifier neural network, a font embedding vector for the unlearned font from the rendered image; and generating the rendered image comprising uppercase and lowercase glyphs and a set of numbers stylized according to the unlearned font on the background.

In some embodiments, the series of acts 1000 includes generating a rendered image comprising glyphs stylized according to a learned font from a subset of learned fonts in a first color on a background of a second color. The series of acts 1000 also includes generating, utilizing the classifier neural network, a font embedding vector for the learned font from the rendered image.

In some embodiments, the series of acts 1000 includes generating, for an unlearned font of the one or more unlearned fonts, a similarity score measuring a distance between the image embedding vector and a font embedding vector of the one or more font embedding vectors. The series of acts 1000 also includes determining a suggested font comprising the unlearned font of the one or more unlearned fonts based on the similarity score of the unlearned font.

In some embodiments, the series of acts 1000 includes generating, utilizing a classifier neural network trained on learned fonts, an image embedding vector from a portion of the digital image comprising text. The series of acts 1000 also includes determining, utilizing the classifier neural network, a first set of one or more font embedding vectors from a subset of the learned fonts. The series of acts 1000 also includes generating, utilizing the classifier neural network, a second set of one or more font embedding vectors from a set of one or more unlearned fonts. The series of acts 1000 also includes determining, for display via a graphical user interface displaying the digital image, a combined set of suggested fonts from the subset of the learned fonts and the set of one or more unlearned fonts for the digital text in the portion of the digital image based on similarity scores comparing the image embedding vector to the first set of one or more font embedding vectors and to the second set of one or more font embedding.

In some embodiments, the series of acts 1000 includes generating one or more rendered images comprising glyphs stylized according to a learned font of the subset of the learned fonts. The series of acts 1000 also includes generating, for the learned font, a font embedding vector from the one or more rendered images utilizing the classifier neural network. The series of acts 1000 also includes generating an initial set of suggested learned fonts from the subset of the learned fonts. The series of acts 1000 also includes selecting, utilizing the classifier neural network, the learned font from the initial set of suggested learned fonts.

In some embodiments, the series of acts 1000 includes generating one or more rendered images comprising glyphs stylized according to a learned font of the set of one or more unlearned fonts; and generating, for the unlearned font, a font embedding vector from the one or more rendered images utilizing the classifier neural network.

In some embodiments, the series of acts 1000 includes generating a first set of similarity scores measuring distances between the image embedding vector and the first set of one or more font embedding vectors. The series of acts 1000 also includes generating a set of second similarity scores measuring distances between the image embedding vector and the second set of one or more font embedding vectors. The series of acts 1000 also includes determining the combined set of suggested fonts from the subset of learned fonts and the set of one or more unlearned fonts based on the first set of similarity scores and the second set of similarity scores. The series of acts 1000 also includes determining a first suggested font from the subset of learned fonts based on the first set of similarity scores and a second suggested font from the set of one or more unlearned fonts based on the second set of similarity scores.

In some embodiments, the series of acts 1000 includes generating, utilizing the classifier neural network, additional digital images comprising the text of the digital image stylized according to the combined set of suggested fonts. The series of acts 1000 also includes determining an updated set of suggested fonts by re-ranking the combined set of suggested fonts based on additional similarity scores generated for the additional digital images.

In some embodiments, the series of acts 1000 includes determining, utilizing a classifier neural network, a set of suggested fonts for a portion of a digital image comprising text based on similarity scores comparing an image embedding vector representing the portion of the digital image to font embedding vectors representing the set of suggested fonts. The series of acts 1000 also includes generating additional digital images comprising the text of the digital image stylized according to the set of suggested fonts. The series of acts 1000 also includes determining, for display via a graphical user interface displaying the digital image, an updated set of suggested fonts by re-ranking the set of suggested fonts based on additional similarity scores comparing the image embedding vector to additional font embedding vectors representing the additional digital images comprising the text of the digital image stylized according to the set of suggested fonts.

In some embodiments, the series of acts 1000 includes selecting, from the set of suggested fonts, a font from a set of learned fonts corresponding to the classifier neural network or a set of unlearned fonts corresponding to a client application at a client device. The series of acts 1000 also includes generating a rendered image of the text of the digital image stylized according to the selected font from the set of suggested fonts.

In some embodiments, the series of acts 1000 includes generating, utilizing the classifier neural network, the additional font embedding vectors for the additional digital images. The series of acts 1000 also includes generating the additional similarity scores comprising cosine similarity metrics measuring differences between the image embedding vector and the additional font embedding vectors. The series of acts 1000 also includes generating, according to a client device, a set of suggested unlearned fonts. The series of acts 1000 also includes generating, utilizing a classifier neural network, a set of suggested learned fonts. The series of acts 1000 also includes combining the set of suggested unlearned fonts and the set of suggested learned fonts to generate the set of suggested fonts.

In some embodiments, the series of acts 1000 includes determining the updated set of suggested fonts further comprises providing, for display via the graphical user interface, the updated set of suggested fonts with the additional digital images comprising the text of the digital image stylized according to the set of suggested fonts and ordered according to the additional similarity scores.

Embodiments of the present disclosure may comprise or utilize a special purpose or general-purpose computer including computer hardware, such as, for example, one or more processors and system memory, as discussed in greater detail below. Embodiments within the scope of the present disclosure also include physical and other computer-readable media for carrying or storing computer-executable instructions and/or data structures. In particular, one or more of the processes described herein may be implemented at least in part as instructions embodied in a non-transitory computer-readable medium and executable by one or more computing devices (e.g., any of the media content access devices described herein). In general, a processor (e.g., a microprocessor) receives instructions, from a non-transitory computer-readable medium, (e.g., a memory, etc.), and executes those instructions, thereby performing one or more processes, including one or more of the processes described herein.

Computer-readable media can be any available media that can be accessed by a general purpose or special purpose computer system. Computer-readable media that store computer-executable instructions are non-transitory computer-readable storage media (devices). Computer-readable media that carry computer-executable instructions are transmission media. Thus, by way of example, and not limitation, embodiments of the disclosure can comprise at least two distinctly different kinds of computer-readable media: non-transitory computer-readable storage media (devices) and transmission media. Non-transitory computer-readable storage media (devices) includes optical and/or non-optical memory, disks, or caches that store computer data interpretable by one or more processors to execute particular functions as described herein. A "network" is defined as one or more data links that enable the transport of electronic data between computer systems and/or modules and/or other electronic devices. Information is transferred or provided over a network (either hardwired, wireless, or a combination of hardwired or wireless) to a computer to carry program code in the form of computer-executable instructions or data structures and which can be accessed by a general purpose or special purpose computer.

Computer-executable instructions comprise, for example, instructions and data which, when executed at a processor, cause a general-purpose computer, special purpose computer, or special purpose processing device to perform a certain function or group of functions. In some embodiments, computer-executable instructions are executed on a general-purpose computer to turn the general-purpose computer into a special purpose computer implementing elements of the disclosure. The computer executable instructions may be, for example, binaries, intermediate format instructions such as assembly language, or even source code.

Embodiments of the present disclosure can also be implemented in cloud computing environments. In this description, "cloud computing" is defined as a model for enabling on-demand network access to a shared pool of configurable computing resources. A cloud-computing model can also expose various service models, such as, for example, Software as a Service ("SaaS"), Platform as a Service ("PaaS"), and Infrastructure as a Service ("IaaS"). A cloud-computing model can also be deployed using different deployment models such as private cloud, community cloud, public cloud, hybrid cloud, and so forth.

Figure 11:
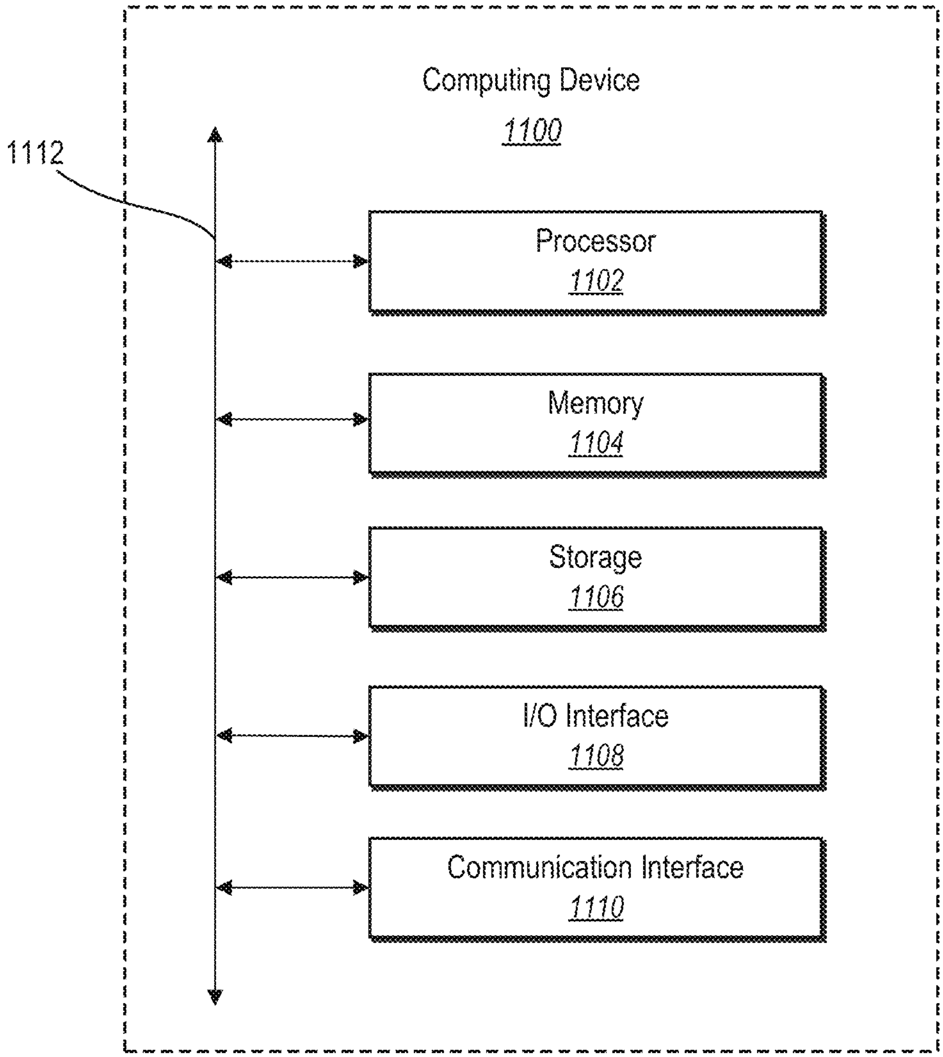
FIG. 11 illustrates a block diagram of an example computing device in accordance with one or more embodiments.

FIG. 11 illustrates, in block diagram form, an example computing device 1100 (e.g., the computing device(s) 900, the client device 114, and/or the server device(s) 102) that may be configured to perform one or more of the processes described above. As shown by FIG. 11, the computing device can comprise a processor(s) 1102, memory 1104, a storage device 1106, an I/O interface 1108, and a communication interface 1110.

In particular embodiments, processor(s) 1102 includes hardware for executing instructions, such as those making up a computer program. As an example, and not by way of limitation, to execute instructions, processor(s) 1102 may retrieve (or fetch) the instructions from an internal register, an internal cache, memory 1104, or a storage device 1106 and decode and execute them. The computing device 1100 includes memory 1104, which is coupled to the processor(s) 1102. The memory 1104 may be used for storing data, metadata, and programs for execution by the processor(s). The memory 1104 may include one or more of volatile and non-volatile memories. The memory 1104 may be internal or distributed memory. The computing device 1100 includes a storage device 1106 includes storage for storing data or instructions. As an example, and not by way of limitation, storage device 1106 can comprise a non-transitory storage medium described above. The computing device 1100 also includes one or more input or output ("I/O") devices/interfaces 1108, which are provided to allow a user to provide input to (such as user strokes), receive output from, and otherwise transfer data to and from the computing device 1100. These I/O devices/interfaces 1108 may include a mouse, keypad or a keyboard, a touch screen, camera, optical scanner, network interface, modem, other known I/O devices or a combination of such I/O devices/interfaces 1108.

The computing device 1100 can further include a communication interface 1110. The communication interface 1110 can include hardware, software, or both. The communication interface 1110 can provide one or more interfaces for communication (such as, for example, packet-based communication) between the computing device and one or more other computing devices (e.g., computing device 1100) or one or more networks. The computing device 1100 can further include a bus 1112. The bus 1112 can comprise hardware, software, or both that couples components of computing device 1100 to each other.

What is claimed is:

1. A computer-implemented method comprising:

generating, utilizing a classifier neural network trained on a set of learned fonts, an image embedding vector from a portion of a digital image comprising digital text;

generating, utilizing the classifier neural network, a set of one or more font embedding vectors from a set of one or more unlearned fonts based on glyphs stylized according to the set of one or more unlearned fonts; and determining, for display via a graphical user interface displaying the digital image, one or more suggested fonts from the set of one or more unlearned fonts for the digital text in the portion of the digital image based on one or more similarity scores comparing the image embedding vector to the set of one or more font embedding vectors.

2. The computer-implemented method of claim 1, wherein generating the image embedding vector comprises:

extracting the portion of the digital image comprising the digital text from the digital image by cropping the digital image to a cropped portion of the digital image comprising the digital text; and generating, utilizing the classifier neural network, the image embedding vector for the cropped portion of the digital image.

3. The computer-implemented method of claim 1, wherein generating the set of one or more font embedding vectors comprises:

generating one or more rendered images of a plurality of glyphs stylized according to an unlearned font of the set of one or more unlearned fonts; and generating, utilizing the classifier neural network, the set of one or more font embedding vectors from the one or more rendered images of the plurality of glyphs.

4. The computer-implemented method of claim 1, wherein generating the set of one or more font embedding vectors further comprises:

generating a plurality of glyph embedding vectors corresponding to separate glyphs stylized according to an unlearned font of the set of one or more unlearned fonts; and generating, utilizing the classifier neural network, a font embedding vector for the unlearned font by averaging the plurality of glyph embedding vectors.

5. The computer-implemented method of claim 1, wherein generating the set of one or more font embedding vectors further comprises:

generating a rendered image comprising glyphs stylized according to an unlearned font of the set of one or more unlearned fonts in a first color on a background of a second color; and generating, utilizing the classifier neural network, a font embedding vector for the unlearned font from the rendered image.

6. The computer-implemented method of claim 5, wherein generating the rendered image comprising generating uppercase and lowercase glyphs and a set of numbers stylized according to the unlearned font on the background.

7. The computer-implemented method of claim 1, wherein generating the set of one or more font embedding vectors further comprises:

generating a rendered image comprising glyphs stylized according to a learned font from a subset of learned fonts in a first color on a background of a second color; and generating, utilizing the classifier neural network, a font embedding vector for the learned font from the rendered image.

8. The computer-implemented method of claim 1, wherein determining the one or more suggested fonts comprises:

generating, for an unlearned font of the set of one or more unlearned fonts, a similarity score measuring a distance between the image embedding vector and a font embedding vector of the set of one or more font embedding vectors; and determining a suggested font comprising the unlearned font of the set of one or more unlearned fonts based on the similarity score of the unlearned font.

9. A system comprising:

one or more memory devices comprising a digital image; and one or more servers configured to cause the system to:

generate, utilizing a classifier neural network trained on learned fonts, an image embedding vector from a portion of the digital image comprising digital text;

determine, utilizing the classifier neural network, a first set of one or more font embedding vectors from a subset of the learned fonts;

generate, utilizing the classifier neural network, a second set of one or more font embedding vectors from a set of one or more unlearned fonts; and determine, for display via a graphical user interface displaying the digital image, a combined set of suggested fonts from the subset of the learned fonts and the set of one or more unlearned fonts for the digital text in the portion of the digital image based on similarity scores comparing the image embedding vector to the first set of one or more font embedding vectors and to the second set of one or more font embedding vectors.

10. The system of claim 9, wherein the one or more servers are configured to determine the first set of one or more font embedding vectors by:

generating one or more rendered images comprising glyphs stylized according to a learned font of the subset of the learned fonts; and generating, for the learned font, a font embedding vector from the one or more rendered images utilizing the classifier neural network.

11. The system of claim 10, wherein the one or more servers are configured to generate the one or more rendered images by:

generating an initial set of suggested learned fonts from the subset of the learned fonts; and selecting, utilizing the classifier neural network, the learned font from the initial set of suggested learned fonts.

12. The system of claim 9, wherein the one or more servers are configured to generate the second set of one or more font embedding vectors by:

generating one or more rendered images comprising glyphs stylized according to an unlearned font of the set of one or more unlearned fonts; and generating, for the unlearned font, a font embedding vector from the one or more rendered images utilizing the classifier neural network.

13. The system of claim 9, wherein the one or more servers are configured to generate the combined set of suggested fonts by:

generating a first set of similarity scores measuring distances between the image embedding vector and the first set of one or more font embedding vectors;

generating a second set of similarity scores measuring distances between the image embedding vector and the second set of one or more font embedding vectors; and determining the combined set of suggested fonts from the subset of the learned fonts and the set of one or more unlearned fonts based on the first set of similarity scores and the second set of similarity scores.

14. The system of claim 13, wherein the one or more servers are configured to generate the combined set of suggested fonts by determining a first suggested font from the subset of the learned fonts based on the first set of similarity scores and a second suggested font from the set of one or more unlearned fonts based on the second set of similarity scores.

15. The system of claim 9, wherein determining the combined set of suggested fonts further comprises:

generating, utilizing the classifier neural network, additional digital images comprising the digital text of the digital image stylized according to the combined set of suggested fonts; and determining an updated set of suggested fonts by re-ranking the combined set of suggested fonts based on additional similarity scores generated for the additional digital images.

16. A non-transitory computer readable medium comprising instructions that, when executed by at least one processor, cause a computing device to perform operations comprising:

determining, utilizing a classifier neural network, a set of suggested fonts for a portion of a digital image comprising text based on similarity scores comparing an image embedding vector representing the portion of the digital image to font embedding vectors representing the set of suggested fonts;

generating additional digital images comprising the text of the digital image stylized according to the set of suggested fonts; and determining, for display via a graphical user interface displaying the digital image, an updated set of suggested fonts by re-ranking the set of suggested fonts based on additional similarity scores comparing the image embedding vector to additional font embedding vectors representing the additional digital images comprising the text of the digital image stylized according to the set of suggested fonts.

17. The non-transitory computer readable medium of claim 16, wherein generating the additional digital images comprises:

selecting, from the set of suggested fonts, a font from a set of learned fonts corresponding to the classifier neural network or a set of unlearned fonts corresponding to a client application at a client device; and generating a rendered image of the text of the digital image stylized according to the selected font from the set of suggested fonts.

18. The non-transitory computer readable medium of claim 16, wherein determining the updated set of suggested fonts comprises:

generating, utilizing the classifier neural network, the additional font embedding vectors for the additional digital images; and generating the additional similarity scores comprising cosine similarity metrics measuring differences between the image embedding vector and the additional font embedding vectors.

19. The non-transitory computer readable medium of claim 18, wherein generating the set of suggested fonts comprises:

generating, according to a client device, a set of suggested unlearned fonts;

generating, utilizing a classifier neural network, a set of suggested learned fonts; and combining the set of suggested unlearned fonts and the set of suggested learned fonts to generate the set of suggested fonts.

20. The non-transitory computer readable medium of claim 16, wherein determining the updated set of suggested fonts further comprises providing, for display via the graphical user interface, the updated set of suggested fonts with the additional digital images comprising the text of the digital image stylized according to the set of suggested fonts and ordered according to the additional similarity scores.

* * * * *